United States Patent
Cho et al.

(10) Patent No.: US 12,513,641 B2
(45) Date of Patent: Dec. 30, 2025

(54) SINGLE-SIDED ROUND TRIP TIME (RTT) LOCATION ESTIMATION

(71) Applicant: QUALCOMM Incorporated, San Diego, CA (US)

(72) Inventors: James Simon Cho, Stateline, NV (US); Xiaoxin Zhang, Sunnyvale, CA (US); Sandip Homchaudhuri, San Jose, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 17/844,390

(22) Filed: Jun. 20, 2022

(65) Prior Publication Data
US 2023/0413208 A1 Dec. 21, 2023

(51) Int. Cl.
*H04W 56/00* (2009.01)

(52) U.S. Cl.
CPC ....... *H04W 56/006* (2013.01); *H04W 56/001* (2013.01)

(58) Field of Classification Search
CPC ............... H04W 72/53; H04W 40/244; H04W 72/0446; H04W 72/27; H04W 92/20; H04W 76/19; H04W 84/12; H04W 76/15; H04W 74/006; H04W 48/16; H04W 74/002; H04L 45/16; H04L 45/24; H04B 7/0413
See application file for complete search history.

(56) References Cited

U.S. PATENT DOCUMENTS

2013/0223261 A1 8/2013 Aggarwal et al.
2014/0003406 A1* 1/2014 Kamath ................ H04W 76/25
370/338

(Continued)

FOREIGN PATENT DOCUMENTS

WO WO-2007056738 A2 * 5/2007 ............. G01S 19/14
WO WO-2011137396 A1 11/2011

(Continued)

OTHER PUBLICATIONS

International Search Report and Written Opinion—PCT/US2023/019931—ISA/EPO—Aug. 21, 2023.

*Primary Examiner* — Chae S Lee
(74) *Attorney, Agent, or Firm* — Holland & Hart LLP

(57) ABSTRACT

This disclosure provides methods, devices and systems for performing a single-sided ranging operation. In some implementations, a first device transmits a first frame to a wireless station (STA), and receives a second frame from the STA responsive to the first frame. The first device obtains information indicating a time period between transmission of the first frame and reception of the second frame by the first device, and obtains information indicating time delays associated with a plurality of second devices, where each of the time delays is between respective receptions of the first frame and the second frame by a respective one of the second devices. The first device obtains a position of the STA based on the time period, the time delays associated with the plurality of second devices, and signal propagation times between the first device and each of the plurality of second devices.

28 Claims, 16 Drawing Sheets

(56) References Cited

U.S. PATENT DOCUMENTS

| | | | | |
|---|---|---|---|---|
| 2015/0139212 A1* | 5/2015 | Wang | ................ | G01S 5/06 |
| | | | | 370/338 |
| 2017/0188191 A1* | 6/2017 | Aldana | ................ | H04W 4/023 |
| 2018/0310273 A1 | 10/2018 | Chu et al. | | |
| 2020/0229124 A1 | 7/2020 | Soriaga et al. | | |
| 2022/0053435 A1 | 2/2022 | King et al. | | |
| 2022/0150859 A1* | 5/2022 | Agrawal | ............. | H04W 56/006 |

FOREIGN PATENT DOCUMENTS

| | | | | |
|---|---|---|---|---|
| WO | WO-2014069950 A1 * | 5/2014 | ............. | G01S 19/34 |
| WO | WO-2016195879 A2 | 12/2016 | | |

* cited by examiner

SINGLE-SIDED ROUND TRIP TIME (RTT) LOCATION ESTIMATION

TECHNICAL FIELD

This disclosure relates generally to wireless communication, and more specifically, to estimating locations of wireless devices.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

The continuing proliferation of Wi-Fi® APs and WLANs has made it possible for positioning systems to use these APs for position determination, especially in areas where there is a large concentration of active APs (such as urban cores, shopping centers, office buildings, sporting venues, and so on). For example, a wireless device such as a cell phone or tablet computer may use the round trip time (RTT) of signals exchanged with an AP to determine the distance between the wireless device and the AP. Once the distances between the wireless device and three APs having known locations are determined, the location of the wireless device may be determined using trilateration techniques.

Because ranging operations are increasingly important for determining the positions of wireless devices, it is desirable to increase the accuracy of ranging operations.

SUMMARY

The systems, methods and devices of this disclosure each have several innovative aspects, no single one of which is solely responsible for the desirable attributes disclosed herein.

One innovative aspect of the subject matter described in this disclosure can be implemented in a first device. The first device may include at least one processor and at least one memory communicatively coupled with the at least one processor. In some implementations, the at least one memory stores processor-readable code that, when executed by the at least one processor, is configured to a transmit a first frame to a wireless station (STA), and to receive a second frame from the STA, the second frame responsive to the first frame. Execution of the processor-readable code is configured to obtain information indicating a time period between transmission of the first frame by the first device and reception of the second frame by the first device, and to obtain information indicating time delays associated with a plurality of second devices, where each time delay of the time delays is between respective receptions of the first frame and the second frame by a respective second device of the plurality of second devices. Execution of the processor-readable code is configured to obtain a position of the STA based on the time period, the time delays associated with the plurality of second devices, and signal propagation times between the first device and each of the plurality of second devices. In some implementations, execution of the processor-readable code may also be configured to enable one or more services for the STA responsive to the position of the STA being within an area or structure, or to disable the one or more services for the STA responsive to the position of the STA being outside the area or structure.

In some instances, the first frame may be a Quality of Service (QoS) Null frame or a Ready-to-Send (RTS) frame, and the second frame may be an acknowledgement (ACK) frame responsive to the QoS Null frame or a Clear-to-Send (CTS) frame responsive to the RTS frame. In some other instances, the first frame may be one of a single-user (SU) physical layer protocol data unit (PPDU) or a multi-user (MU) PPDU transmitted over an entire bandwidth of a wireless channel, and the second frame may be an acknowledgement (ACK) frame or a block ACK (BA) frame received over the entire bandwidth of the wireless channel.

In various implementations, the position of the STA may be obtained independently of time periods or time delays associated with the STA. In some instances, the time period may be associated with an end of the transmission of the first frame and a start of the reception of the second frame, and each of the time delays may be associated with an end of the reception of the first frame and a start of the reception of the second frame by the respective second device of the plurality of second devices. In some other instances, the time period may be equal to a sum of a signal propagation time from the first device to the STA, a Short Inter-Frame Spacing (SIFS) duration associated with the STA, and a signal propagation time from the STA to the first device. In some aspects, a respective time delay associated with a respective second device may be equal to a sum of the signal propagation time from the first device to the STA, the SIFS duration associated with the STA, and a signal propagation time from the STA to the respective second device, minus a signal propagation time from the first device to the second device.

In some implementations, execution of the processor-readable code to obtain the position of the STA may be configured to obtain a first relationship between the time period and a difference between coordinates of the STA and coordinates of the first device. Execution of the processor-readable code to obtain the position of the STA may also be configured to obtain, for each of the plurality of second devices, a second relationship between the respective time delay associated with the respective second device and a difference between the coordinates of the STA and coordinates of the respective second device. Execution of the processor-readable code to obtain the position of the STA may also be configured to obtain the coordinates of the plurality of second devices, and to obtain the coordinates of the STA based on a trilateration of the first relationship and the plurality of respective second relationships. In various aspects, execution of the processor-readable code may also be configured to obtain the coordinates of the STA based on a trilateration of the first relationship and the second relationship for each respective second device of the plurality of second devices. Execution of the processor-readable code may also be configured to transmit an indication of the SIFS duration to the STA.

In some implementations, the first device may be a first access point (AP) associated with the STA, and the plurality of second devices may be a plurality of respective passive listening devices not associated with the STA. In some instances, execution of the processor-readable code may also be configured to receive, from each of the plurality of second devices, a third frame indicating the time delay associated with the respective second device. In some other implementations, one or both of the information indicating the time delays associated with the plurality of second devices or the position of the STA may be obtained from a network entity. In some instances, execution of the processor-readable code may also be configured to obtain, from the network entity, coordinates of the STA relative to coordinates of the first device.

In some implementations, execution of the processor-readable code may also be configured to assign a sequence number to the first frame, to transmit an indication of the sequence number to each of the plurality of second devices, and to transmit an instruction to each of the plurality of second devices to report time-of-arrival (TOA) timestamps of all first frames carrying the indicated sequence number and to report TOA timestamps of all second frames responsive to the first frames. In some other implementations, execution of the processor-readable code may also be configured to embed a signal or value within the first frame, to transmit an indication of the signal or value to each of the plurality of second devices, and to transmit an instruction to each of the plurality of second devices to report TOA timestamps of all first frames carrying the embedded signal or value and to report TOA timestamps of all second frames responsive to the first frames that carry the embedded signal or value. In some aspects, the embedded signal or value may be indicated by one of a reserved or unused bit of a preamble of the first frame, a reserved or unused bit of a medium access control (MAC) header of the first frame, or a reserved or unused bit of an element, field, or subfield following the MAC header of the first frame.

Another innovative aspect of the subject matter described in this disclosure can be implemented as a method of wireless communication by a first device. In some implementations, the method includes transmitting a first frame to a STA, and receiving a second frame from the STA, the second frame responsive to the first frame. The method includes obtaining information indicating a time period between transmission of the first frame by the first device and reception of the second frame by the first device, and obtaining information indicating time delays associated with a plurality of second devices, where each time delay of the time delays is between respective receptions of the first frame and the second frame by a respective second device of the plurality of second devices. The method includes obtaining a position of the STA based on the time period, the time delays associated with the plurality of second devices, and signal propagation times between the first device and each of the plurality of second devices. In some implementations, the method may also include enabling one or more services for the STA responsive to the position of the STA being within an area or structure, or disabling the one or more services for the STA responsive to the position of the STA being outside the area or structure.

In some instances, the first frame may be a QoS Null frame or an RTS frame, and the second frame may be an ACK frame responsive to the QoS Null frame or a CTS frame responsive to the RTS frame. In some other instances, the first frame may be one of an SU PPDU or an MU PPDU transmitted over an entire bandwidth of a wireless channel, and the second frame may be an ACK frame or a BA frame received over the entire bandwidth of the wireless channel.

In various implementations, the position of the STA may be obtained independently of time periods or time delays associated with the STA. In some instances, the time period may be associated with an end of the transmission of the first frame and a start of the reception of the second frame, and each of the time delays may be associated with an end of the reception of the first frame and a start of the reception of the second frame by the respective second device of the plurality of second devices. In some other instances, the time period may be equal to a sum of a signal propagation time from the first device to the STA, a SIFS duration associated with the STA, and a signal propagation time from the STA to the first device. In some aspects, a respective time delay associated with a respective second device may be equal to a sum of the signal propagation time from the first device to the STA, the SIFS duration associated with the STA, and a signal propagation time from the STA to the respective second device, minus a signal propagation time from the first device to the second device.

In some implementations, obtaining the position of the STA may include obtaining a first relationship between the time period and a difference between coordinates of the STA and coordinates of the first device. Obtaining the position of the STA may include obtaining, for each of the plurality of second devices, a second relationship between the respective time delay associated with the respective second device and a difference between the coordinates of the STA and coordinates of the respective second device. Obtaining the position of the STA may include obtaining the coordinates of the plurality of second devices, and obtaining the coordinates of the STA based on a trilateration of the first relationship and the plurality of respective second relationships. In various aspects, the method may also include obtaining the coordinates of the STA based on a trilateration of the first relationship and the second relationship for each respective second device of the plurality of second devices, and transmitting an indication of the SIFS duration to the STA.

In some implementations, the first device may be a first AP associated with the STA, and the plurality of second devices may be a plurality of respective passive listening devices not associated with the STA. In some instances, the method may also include receiving, from each of the plurality of second devices, a third frame indicating the time delay associated with the respective second device. In some other implementations, one or both of the information indicating the time delays associated with the plurality of second devices or the position of the STA may be obtained from a network entity. In some instances, the method may also include obtaining, from the network entity, coordinates of the STA relative to coordinates of the first device.

In some implementations, the method may also include assigning a sequence number to the first frame, transmitting an indication of the sequence number to each of the plurality of second devices, and transmitting an instruction to each of the plurality of second devices to report TOA timestamps of all first frames carrying the indicated sequence number and to report TOA timestamps of all second frames responsive to the first frames. In some other implementations, the method may also include embedding a signal or value within the first frame, transmitting an indication of the signal or value to each of the plurality of second devices, and transmitting an instruction to each of the plurality of second devices to report TOA timestamps of all first frames carrying the embedded signal or value and to report TOA timestamps of all second frames responsive to the first frames that carry the embedded signal or value. In some aspects, the embedded signal or value may be indicated by one of a reserved or unused bit of a preamble of the first frame, a reserved or unused bit of a MAC header of the first frame, or a reserved or unused bit of an element, field, or subfield following the MAC header of the first frame.

Another innovative aspect of the subject matter described in this disclosure can be implemented as a method of wireless communication by an apparatus. The apparatus may include means for transmitting a first frame to a wireless station (STA), means for receiving a second frame from the STA, the second frame responsive to the first frame, and means for obtaining information indicating a time period between transmission of the first frame by the apparatus and reception of the second frame by the apparatus. The apparatus may include means for obtaining information indicating time delays associated with a plurality of second devices, where each time delay of the time delays is between respective receptions of the first frame and the second frame by a respective second device of the plurality of second devices. The apparatus may include means for obtaining a position of the STA based on the time period, the time delays associated with the plurality of second devices, and signal propagation times between the apparatus and each of the plurality of second devices.

Another innovative aspect of the subject matter described in this disclosure can be implemented in a non-transitory computer-readable storage medium. The non-transitory computer-readable storage medium stores processor-readable code that, when executed by one or more processors of an apparatus, causes the apparatus to perform operations. In some implementations, the operations may include transmitting a first frame to a wireless station (STA), receiving a second frame from the STA, the second frame responsive to the first frame, and obtaining information indicating a time period between transmission of the first frame by the apparatus and reception of the second frame by the apparatus. The operations may include obtaining information indicating time delays associated with a plurality of second devices, where each time delay of the time delays is between respective receptions of the first frame and the second frame by a respective second device of the plurality of second devices. The operations may include obtaining a position of the STA based on the time period, the time delays associated with the plurality of second devices, and signal propagation times between the apparatus and each of the plurality of second devices.

Details of one or more implementations of the subject matter described in this disclosure are set forth in the accompanying drawings and the description herein. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
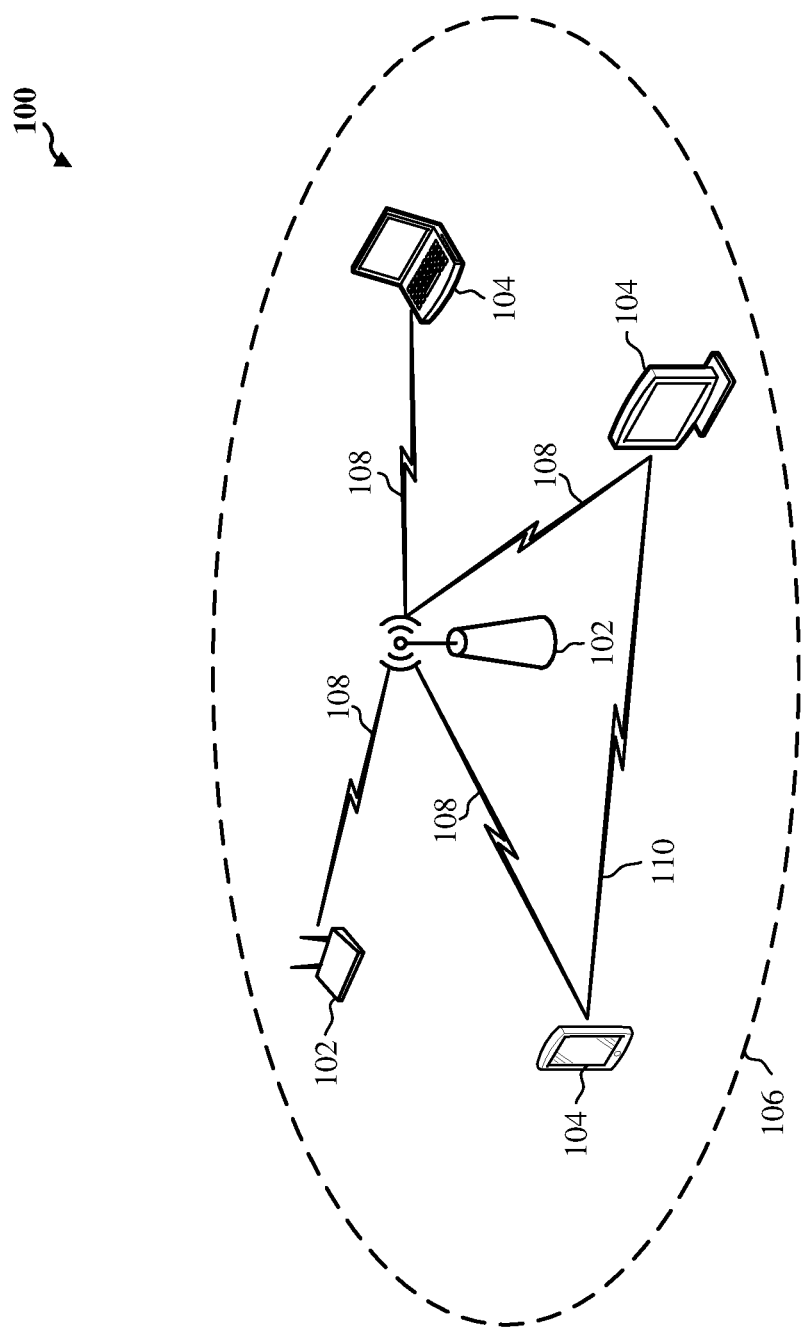
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

The distance between a pair of devices may be determined using the round-trip time (RTT) of signals exchanged between the pair of devices. The distance (d) between a first device and a second device may be expressed as $d=c*RTT/2$, where c is the speed of light, and RTT is the summation of the signal propagation time of a first frame transmitted from the first device to the second device and the signal propagation time of a second frame transmitted from the second device to the first device. Specifically, the value of RTT may be equal to the time difference between the time of departure (TOD) of the first frame from the first device and the time of arrival (TOA) of the second frame at the first device minus the time delay between reception of the first frame at the second device and transmission of the second frame by the second device. The time delay, which may be associated with the second device switching from a receiving mode to a transmitting mode, may be a Short Inter-Frame Spacing (SIFS) duration.

Time delays and SIFS durations may vary between wireless devices, particularly between different make-and-models of wireless devices, due to clock drift resulting from process variations inherent in semiconductor fabrication techniques. As such, the SIFS duration associated with the second device is typically estimated, which can lead to unacceptable ranging errors. For example, although the IEEE 802.11 family of wireless communication standards specify the SIFS duration as 10 microseconds (μs) with tolerance of ±900 nanoseconds (ns) for signals transmitted in the 2.4 GHz frequency band, SIFS estimation errors of only ±25 ns can result in ranging errors of ±7.5 meters, which may be unacceptable for many indoor positioning applications.

Although the Fine Timing Measurement (FTM) protocol defined in the 802.11REVmc, the 11REVmd, the 11REVme, and the 11ax amendments to the IEEE 802.11 standard allows RTT values to be obtained without estimating SIFS, the FTM protocol involves the exchange of 6 or more frames between ranging devices, which may increase congestion and latencies on a shared wireless medium. In addition, many wireless devices do not support the FTM protocol or the RTT ranging procedures described in the IEEE 802.11 standard, and are therefore unable to participate in such ranging operations.

Various implementations relate generally to positioning in wireless networks, and specifically, to a single-sided RTT operation that can range a STA, using two frame transmissions, without estimating the SIFS duration of the STA and irrespective of whether or not the STA supports any standards-based ranging procedures (such as the FTM protocol). In some implementations, a first device may transmit a first frame over a wireless medium to a STA. The STA receives the first frame, and transmits a second frame, responsive to the first frame, to the first device. The first device may obtain information indicating a time period between the transmission of the first frame and the reception of the second frame. In some instances, the first device may also obtain information indicating time delays associated with a plurality of second devices, where each of the indicated time delays is between respective receptions of the first frame and the second frame by a respective one of the second devices. In some implementations, the position of the STA may be obtained based on the time period, the time delays associated with the plurality of second devices, and signal propagation times between the first device and each of the plurality of second devices. In some aspects, the position of the STA may be obtained independently of time periods, time delays, or other measurements associated with the STA.

Particular implementations of the subject matter described in this disclosure can be implemented to realize one or more of the following potential advantages. By obtaining the position of a STA based on two frame transmissions as described above and throughout the present application (e.g., without estimating SIFS), the accuracy of ranging operations may be increased because the obtained position of the STA is independent of uncertainties and timing errors associated with estimating SIFS. Additionally, or alternatively, the position of the STA may be obtained while minimizing overhead, congestion, and latencies associated with ranging operations. For example, the described technique that uses two frame transmissions to obtain the location of a STA may reduce communications over the network compared to the FTM protocol that involves the exchange of 6 or more frames between ranging devices. Also, the ability to range a STA that does not support standards-based positioning procedures, using two frame exchanges, may be used to provide a more complete mapping of STAs located in, or passing through, a certain area or structure (as compared with obtaining the positions of only those STAs that support standards-based positioning procedures).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
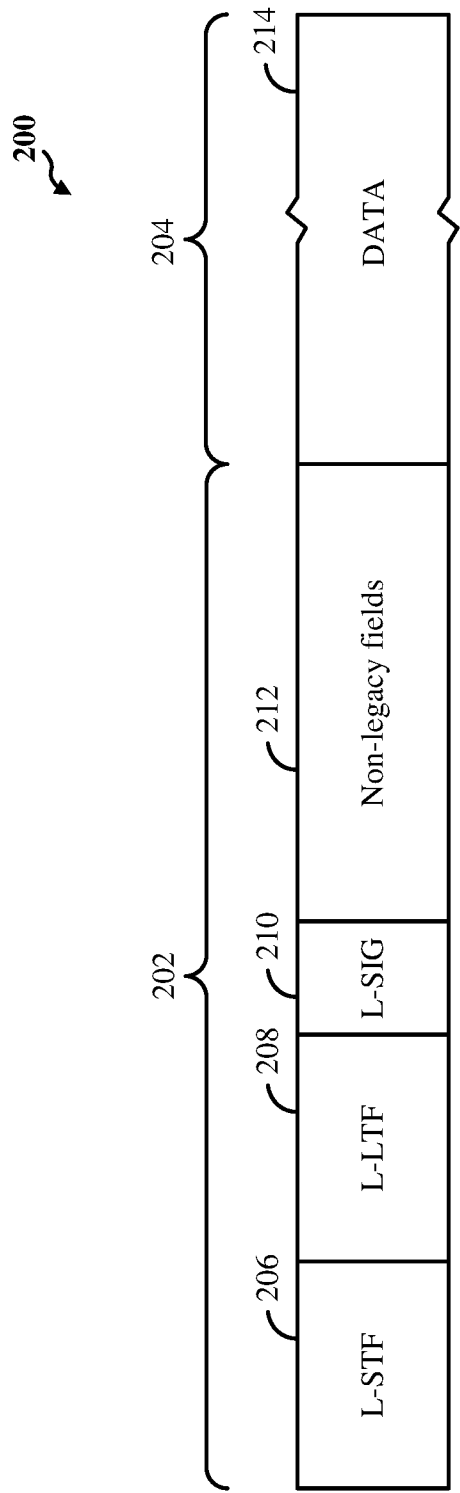
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
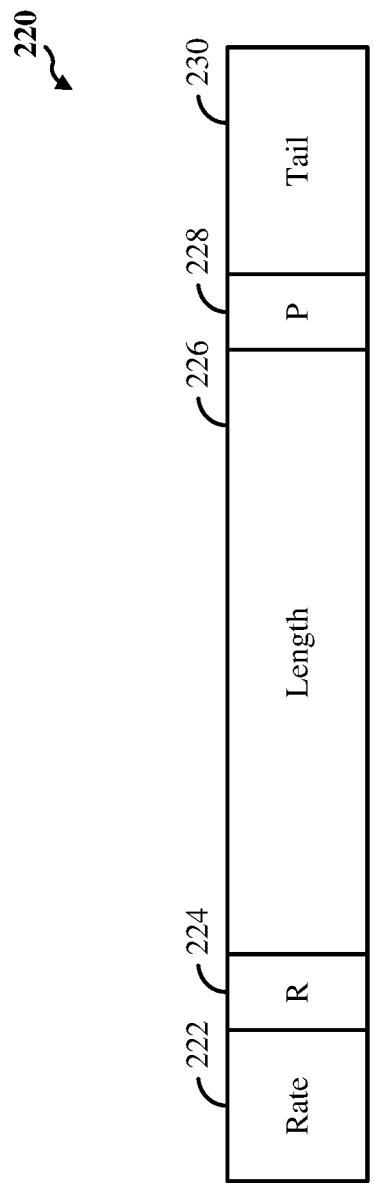
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (p s) or other time units.

Figure 3A:
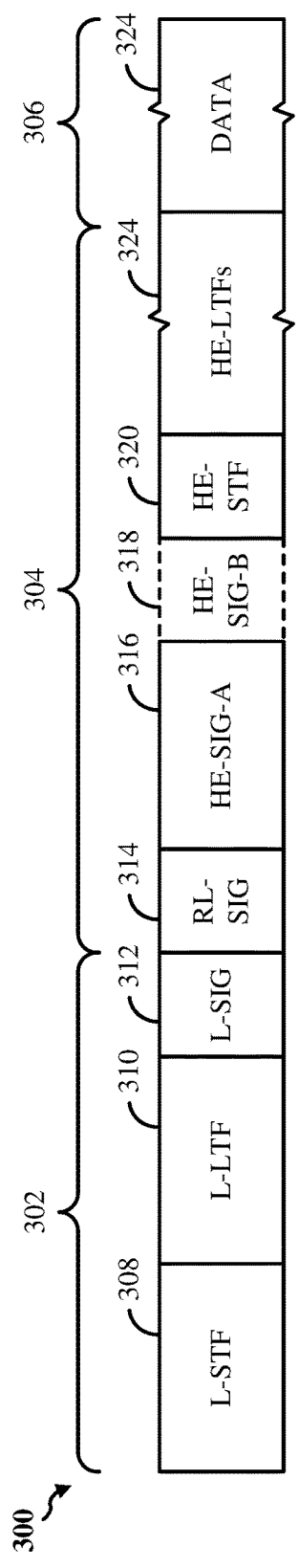
FIG. 3A shows another example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the non-legacy portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-B 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
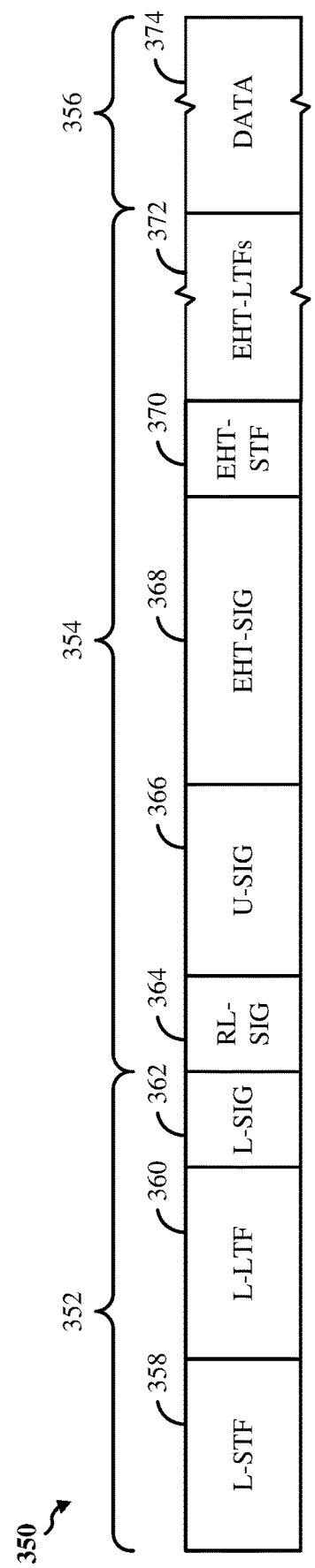
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
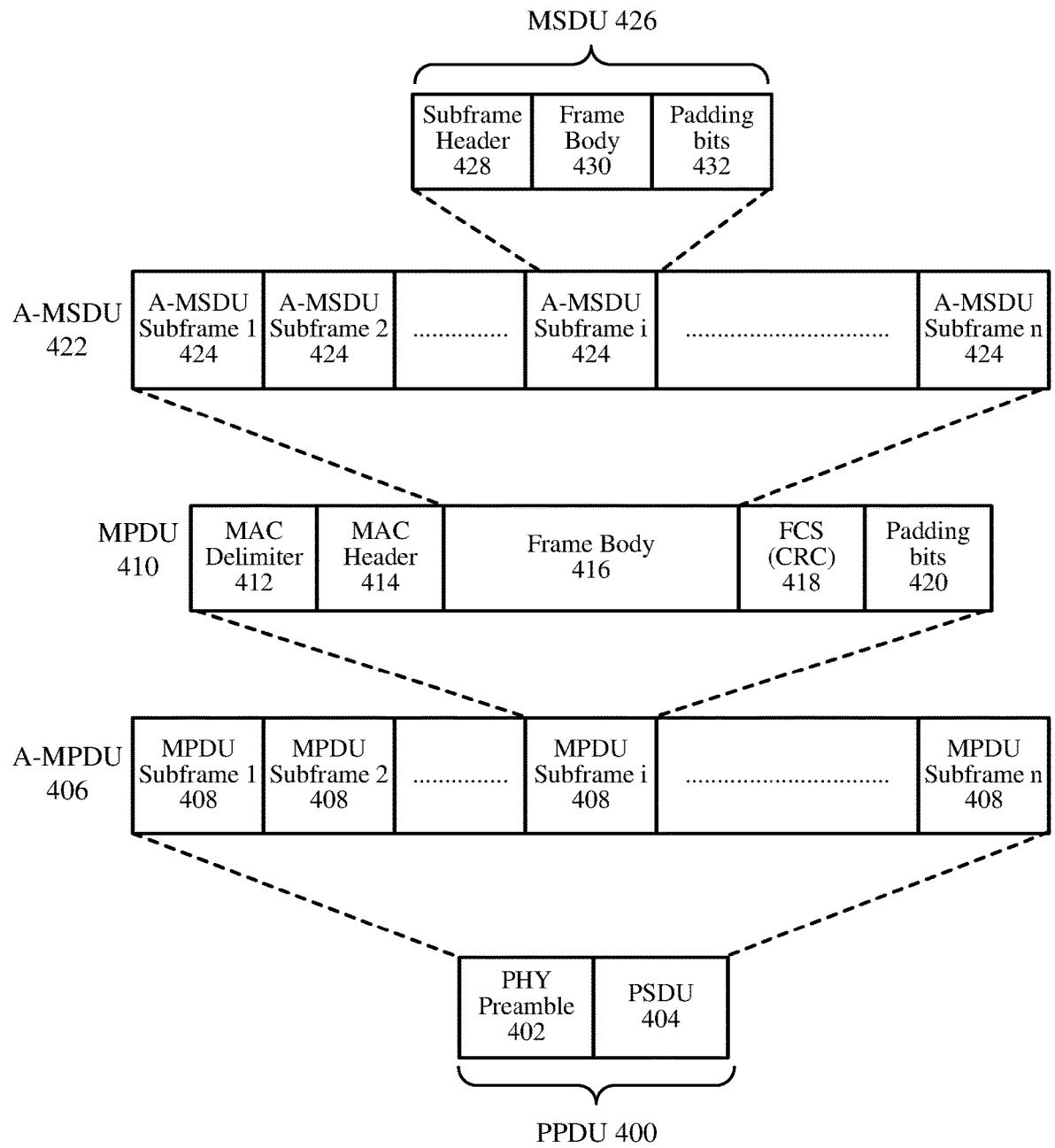
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may include a MAC delimiter 412 and a MAC header 414 prior to the accompanying frame body 416, which includes the data portion or "payload" of the MPDU subframe 408. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the A-MPDU subframe 406, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 414 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 408 also may include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
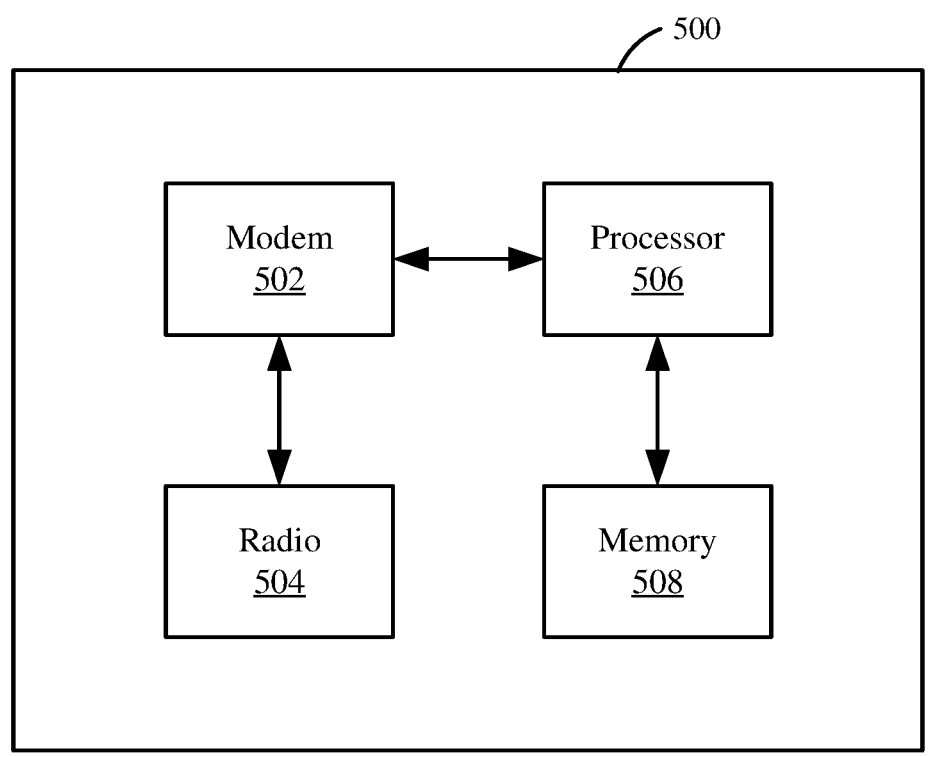
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements (collectively "the processor 506"), and one or more memory blocks or elements (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which transmits the symbols via the coupled antennas. Similarly, symbols received via the antennas are obtained by the radio 504, which provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
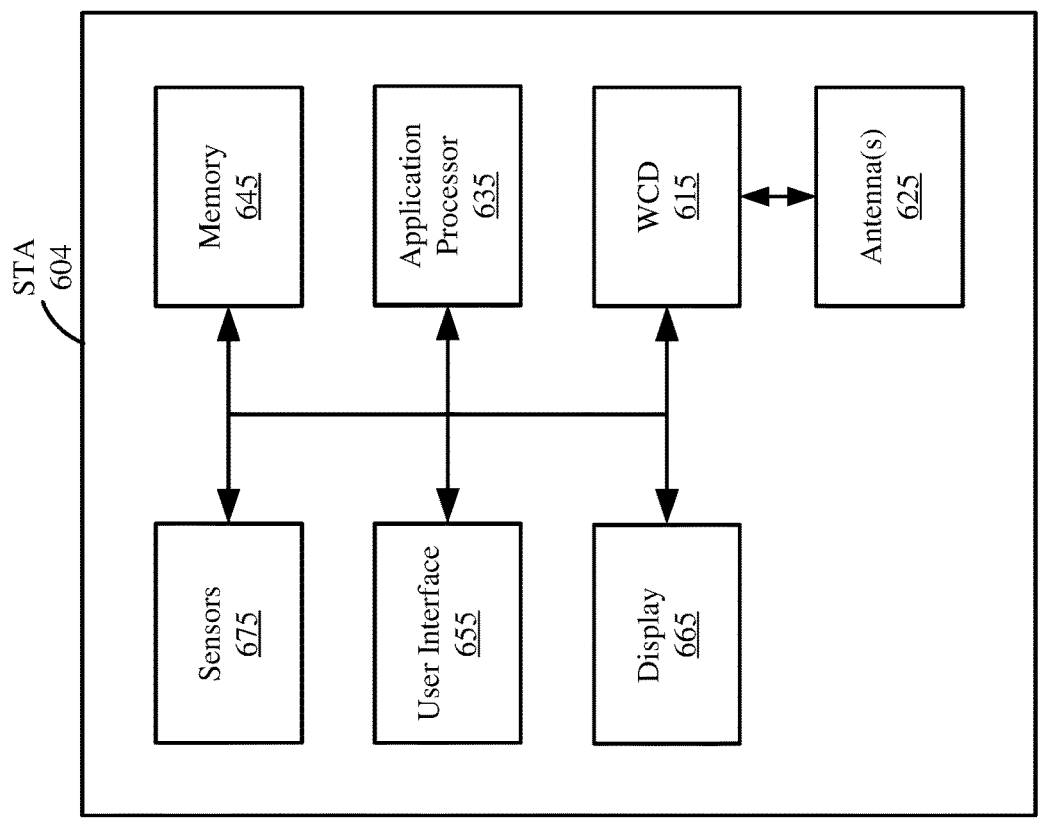
FIG. 6B shows a block diagram of an example station (STA).
Figure 6A:
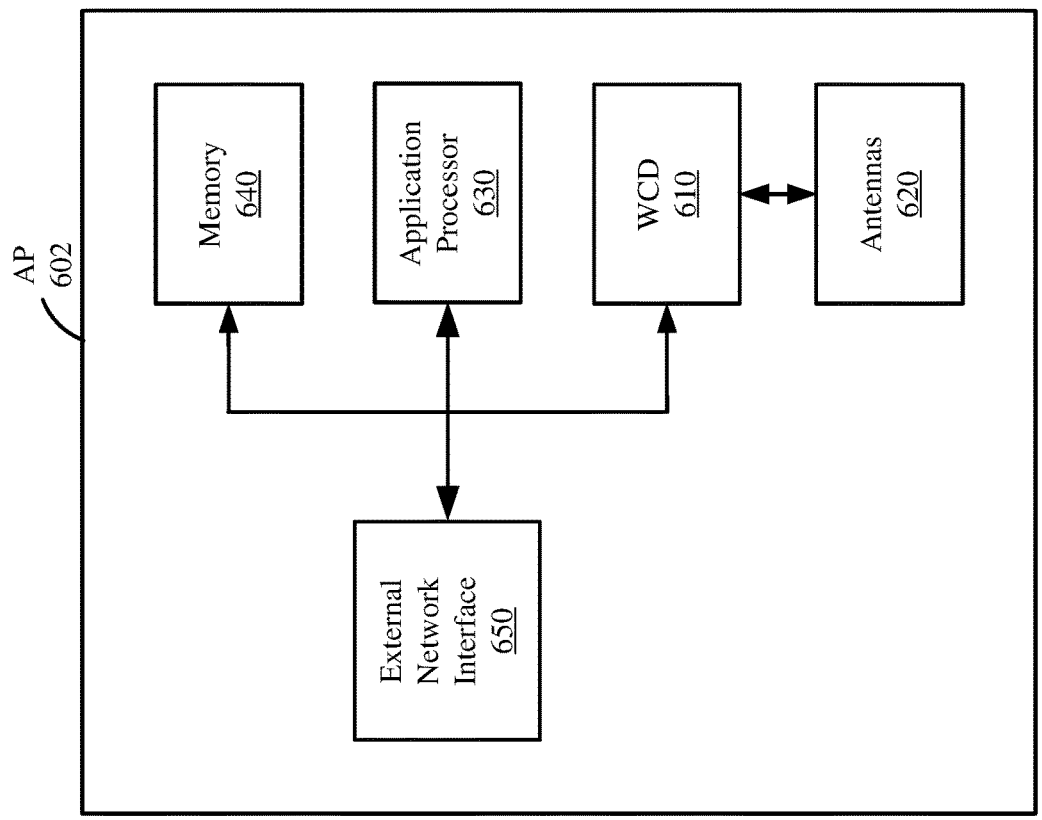
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7:
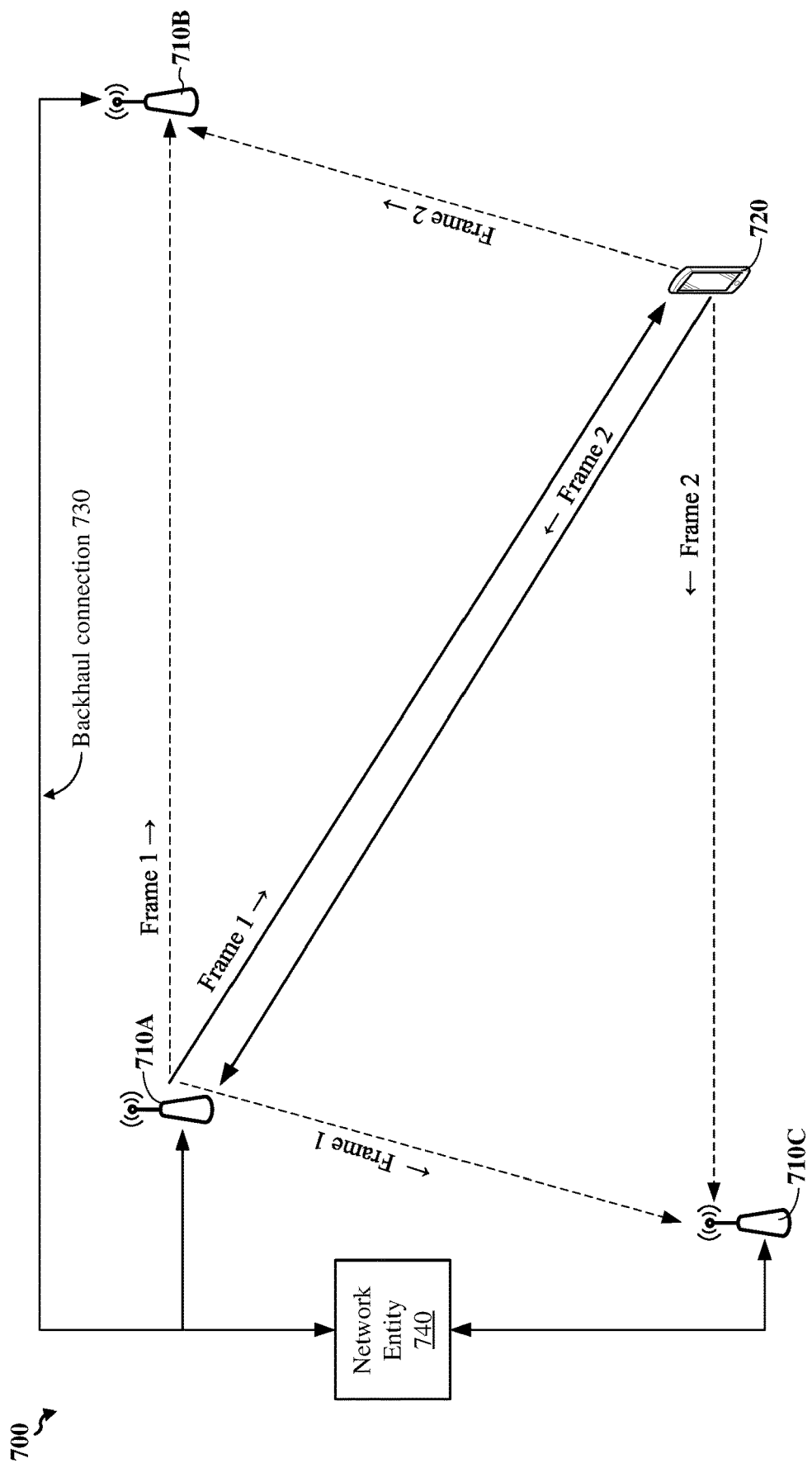
FIG. 7 shows a pictorial diagram of another example wireless network.

FIG. 7 shows a block diagram of another example wireless network 700. In some aspects, the wireless network 700 can be an example of the WLAN 100 of FIG. 1. The wireless network 700 is shown to include a first AP 710A, a second AP 710B, a third AP 710C, and a STA 720. The APs 710A, 710B, and 710C may be any suitable access terminal, base station, or Wi-Fi access point such as the AP 102 of FIG. 1, the wireless communication device 500 of FIG. 5, or the AP 602 of FIG. 6A. The STA 720 may be any suitable wireless communication device such as one of the STAs 104 of FIG. 1, the wireless communication device 500 of FIG. 5, or the STA 604 of FIG. 6B. In the example of FIG. 7, the STA 720 is associated with the first AP 710, and is not associated with the second AP 710B or the third AP 710C. Although only three APs 710A-710C are shown in the example of FIG. 7, in some other instances, the example wireless communication 700 may include other numbers of APs. In other implementations, one or both of the second AP 710B or the third AP 710C may be replaced by a corresponding passive listening device such as, for example, a passive STA.

In some implementations, the APs 710A, 710B, and 710C may be part of an extended basic service set (ESS) or an enterprise network that includes a backhaul connection 730 over which the APs 710A, 710B, and 710C can exchange information such as time delays, signal propagation times, TOD timestamps, TOA timestamps, time difference of arrival (TDOA) information, or TSF values, among other examples. In some instances, the APs 710A, 710B, and 710C may be connected to a network entity 740 over the backhaul connection 730. The network entity 740 may be a network controller, a network administrator, or other suitable entity that can control various operations, configurations, and parameters associated with the wireless network 700. For example, in some instances, the network entity 740 may store positioning information, timing relationships, and other information of the APs 710A-710C that can be used to obtain the position of the STA based on a pair of frames exchanged with the STA 720.

In some implementations, the first AP 710 may transmit a first frame over the wireless channel to the STA 720, and the first AP 710 may capture a TOD timestamp of the first frame. In some instances, the TOD timestamp may correspond to an end of the transmission of the first frame by the first AP 710A. The STA 720 receives the first frame, and responds by transmitting a second frame over the wireless channel to the first AP 710A. The time delay between an end of the reception of the first frame at the STA 720 and a start of the transmission of the second frame by the STA 720 may be a SIFS duration associated with the STA 720. The first AP 710A receives the second frame from the STA 720, and captures a TOA timestamp of the second frame. In some aspects, the TOA timestamp of the second frame may correspond to a start of the reception of the second frame by the first AP 710A.

In some instances, the STA 720, the second AP 710B, and the third AP 710C may be separated from the first AP 710A by different distances, and therefore the first frame may be received by the STA 720, the second AP 710B, and the third AP 710C at different times. Similarly, the first AP 710A, the second AP 710B, and the third AP 710C may be separated from the STA 720 by different distances, and therefore the second frame may be received by the first AP 710A, the second AP 710B, and the third AP 710C at different times. For example, in the example of FIG. 7, the second AP 710B is located closest to the first AP 710A, followed by the third AP 710C, and then the STA 720. As a result, the first frame arrives at the second AP 710B, then arrives at the third AP 710C (after some time period), and then arrives at the STA 720 (after another time period). Similarly, in the example of FIG. 7, the third AP 710C is located closest to the STA 720, followed by the second AP 710, and then the first AP 710A. As a result, the second frame arrives at the third AP 710C, then arrives at the second AP 710B (after some time period), and then arrives at the first AP 710A (after another time period).

Figure 8:
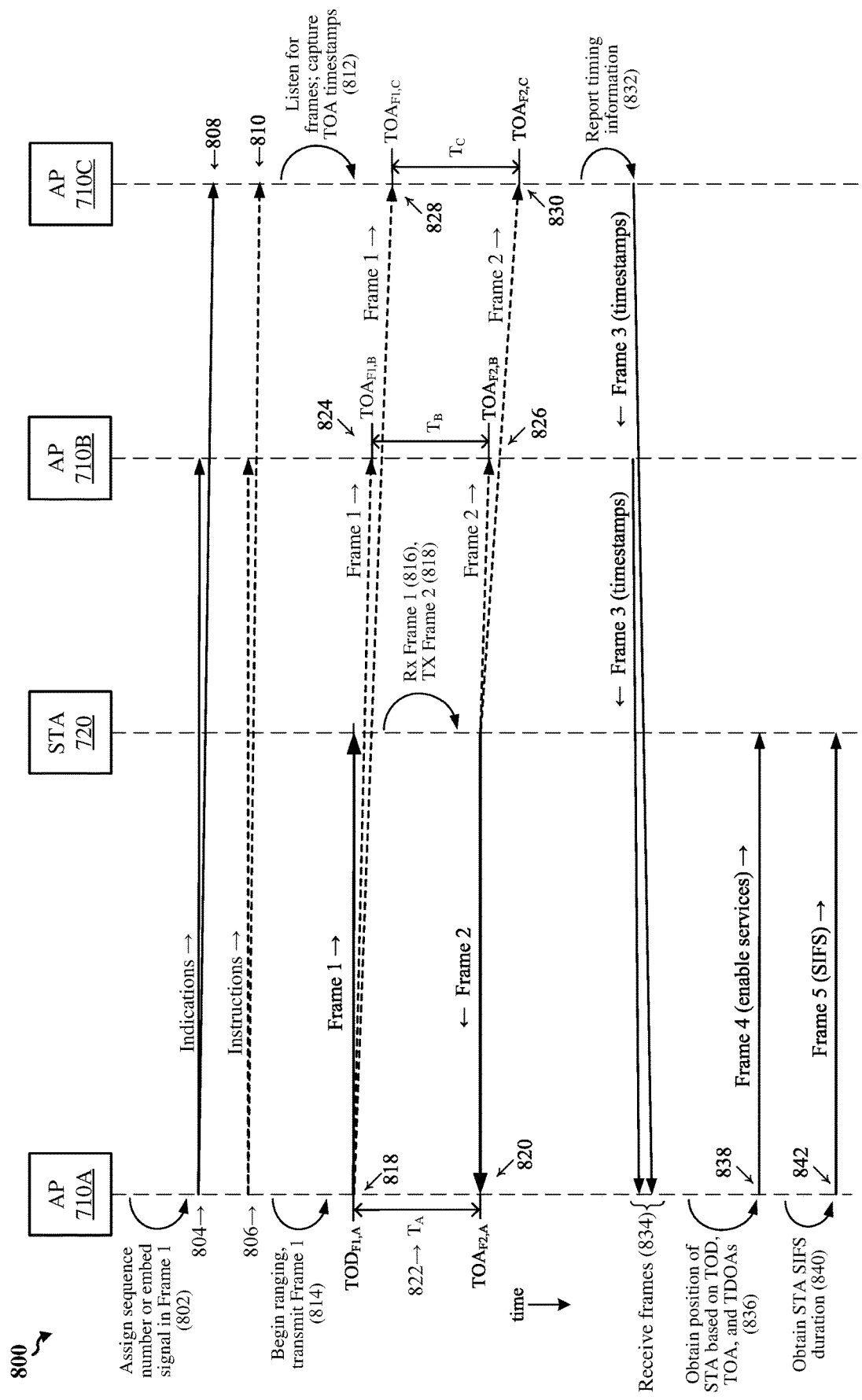
FIG. 8 shows a timing diagram of an example wireless communication that supports single-sided ranging operations.

FIG. 8 shows a sequence diagram of an example wireless communication 800 that supports single-sided ranging operations. The wireless communication 800 may be associated with the STA 720 and the APs 710A, 710B, and 710C described with reference to FIG. 7. As discussed, the STA 720 and the first AP 710A are associated with each other, and the STA 720 is not associated with the second AP 720B or the third AP 710C. In the example of FIG. 8, the third AP 710C is closest to the first AP 710A, followed by the second AP 710B, and then the STA 720. As such, frames transmitted by the first AP 710A first arrive at the third AP 710C, then arrive at the second AP 710B, and then arrive at the STA 720. Also, the second AP 710B is closest to the STA 720, followed by the third AP 710C, and then the first AP 710A. As such, frames transmitted by the STA 720 first arrive at the second AP 710B, then arrive at the third AP 710C, and then arrive at the first AP 710A.

In some instances, at 802, the first AP 710A may assign a sequence number to the first frame to be transmitted by the first AP 710A to the STA 720. The assigned sequence number may be a unique or selected sequence number indicating that the first frame is associated with a ranging operation. In some other instances, the first AP 710A may embed, within the first frame, a signal indicating that the first frame is associated with the ranging operation. The signal may be embedded within any suitable portion of the first frame including (but not limited to) a reserved or unused bit of a preamble of the first frame, a reserved or unused bit of a MAC header of the first frame, or a reserved or unused bit of an element, subelement, field, or subfield following the MAC header of the first frame.

At 804, the first AP 710A may transmit an indication of the assigned sequence number or the embedded signal to the second AP 710B and the third AP 710C (or other nearby passive listening devices). In some instances, the indication may be transmitted to the second and third APs 710B and 710C in a suitable management frame, control frame, or action frame. In some other instances, the indication may be sent to the second and third APs 710B and 710C over the backhaul connection 730 described with reference to FIG. 7. In some other instances, the indication may be sent to the second and third APs 710B and 710C by the network entity 740 described with reference to FIG. 7.

In some aspects, a presence of the assigned sequence number or the embedded signal in frames transmitted by the first AP 710A may be an implicit instruction for the second and third APs 710B and 710C (and other nearby passive listening devices) to capture TOA timestamps of the first frames, to capture TOA timestamps of second frames transmitted in response to the first frames, and to report the captured TOA timestamps to one or both of the first AP 710A or the network entity 740. In some other aspects, at 806, the first AP 710A may transmit an explicit instruction for each of the second AP 710B and the third AP 710C to capture TOA timestamps of the first frames, to capture TOA timestamps of the second frames, and to report the captured TOA timestamps to one or both of the first AP 710A or the network entity 740.

The second and third APs 710B and 710C receive the indication of the assigned sequence number or the embedded signal at 808 and 810, respectively, and listen for frames carrying the assigned sequence number or the embedded signal based on the implicit instruction associated with the indication or the explicit instruction sent by the first AP 710A, at 812.

In some instances, at 814, the first AP 710A begins the operation 800 by transmitting the first frame over the wireless medium to the STA 720, and captures the TOD timestamp of the first frame as $TOD_{F1,A}$. In some aspects, the $TOD_{F1,A}$ timestamp may correspond to an end of the transmission of the first frame (such as the last symbol of the first frame transmitted over the wireless medium). The first frame may indicate the sequence number (e.g., assigned at step 802) and may be any suitable frame, packet, or message that elicits a response from the STA 720. In some instances, the first frame may be a QoS Null frame or an RTS frame. In other instances, the first frame may be an SU PPDU or an MU PPDU. In some other instances, the first frame may be an MU-RTS trigger frame or an NDP, among other examples.

The STA 720 receives the first frame at 816, and acknowledges reception of the first frame by transmitting a second frame over the wireless medium to the first AP 710A, at 818. The second frame may be any suitable frame, packet, or message responsive to the first frame. For example, the second frame may be an ACK frame responsive to a QoS Null frame transmitted by the first AP 710A, may be a CTS frame responsive to an RTS frame, an MU-RTS trigger frame, or an NDP transmitted by the first AP 710A, or may be an ACK or BA frame responsive to an SU PPDU or MU PPDU transmitted by the first AP 710A. As discussed, the time delay between an end of the reception of the first frame by the STA 720 and a start of the transmission of the second frame by the STA 720 may be the SIFS duration associated with the STA 720.

The first AP 710A receives the second frame from the STA 720 at 820, and captures the TOA timestamp as $TOA_{F2,A}$ at the start of the reception of second frame by the first AP 710A. The first AP 710A may obtain information indicating the time period $T_A$ between the transmission of the first frame from the first AP 710A and the reception of the second frame by the first AP 710A, at 822. The time period $T_A$ may be expressed as $T_A = TOD_{F1,A} - TOA_{F2,A} + S$, where S is the SIFS duration associated with the STA 720. In some aspects, the first AP 710A may determine, calculate, or otherwise obtain the time period $T_A$. In other aspects, the first AP 710A may obtain the time period $T_A$ from the network entity 740 of FIG. 7.

The second and third APs 710B and 710C also receive the first frame transmitted by the first AP 710A and the second frame transmitted by the STA 720. Specifically, the second AP 710B receives the first frame from the first AP 710A at 824, and after a time delay, receives the second frame from the STA 720 at 826. The second AP 710B captures the TOA timestamp of the first frame as $TOA_{F1,B}$, and captures the TOA timestamp of the second frame as $TOA_{F2,B}$. The time delay ($T_B$) between an end of the reception of the first frame and a start of the reception of the second frame at the second AP 710B may be expressed as $T_B = TOA_{F2,B} - TOA_{F1,B}$. Similarly, the third AP 710C receives the first frame from the first AP 710A at 828, and after a time delay, receives the second frame from the STA 720 at 830. The third AP 710C captures the TOA timestamp of the first frame as $TOA_{F1,C}$, and captures the TOA timestamp of the second frame as $TOA_{F2,C}$. The time delay ($T_C$) between an end of the reception of the first frame and a start of the reception of the second frame at the third AP 710C may be expressed as $T_C = TOA_{F2,C} - TOA_{F1,C}$.

In some instances, at 832, the second and third APs 710B and 710C may report timing information associated with the respective time delays $T_B$ and $T_C$ to one or both of the first AP 710A or the network entity 740. In some other instances, the first, second, and third APs 710A, 710B, and 710C may report timing information associated with the respective time delays $T_A$, $T_B$, and $T_C$ to the network entity 740. In some instances, the second AP 710B may send an indication of the time delay $T_B$ to the first AP 710A in a corresponding third frame transmitted over the wireless medium, and the third AP 710C may send an indication of the time delay $T_C$ to the first AP 710A in a corresponding third frame transmitted over the wireless medium. In other instances, the second AP 710B may send the captured timestamps ($TOA_{F1,B}$ and $TOA_{F2,B}$) to the first AP 710A in the corresponding third frame, and the third AP 710C may send the captured timestamps ($TOA_{F1,C}$ and $TOA_{F2,C}$) to the first AP 710A in the corresponding third frame. The third frames may be one of a management frame, a control frame, or an action frame, among other examples. In some other instances, the second AP 710B may send the indication of $T_B$ or the captured timestamps $TOA_{F1,B}$ and $TOA_{F2,B}$ to the first AP 710A or the network entity 740 over the backhaul connection 730, and the third AP 710C may send the indication of $T_C$ or the captured timestamps $TOA_{F1,C}$ and $TOA_{F2,C}$ to the first AP 710A or the network entity 740 over the backhaul connection 730.

At 834, the first AP 710A may receive the third frames indicating the respective time delays $T_B$ and $T_C$ associated with the second and third APs 710B and 710C. The first AP 710A may obtain the signal propagation times or distances between the first AP 710A and each of the second AP 710B and the third AP 710C, either from an associated memory or from the network entity 740, at 836. As discussed, the network entity 740 may store the locations of the APs 710A-710C as coordinates, and may obtain the distances between the first AP 710A and each of the second and third APs 710B and 710C based on the respective coordinates of the APs 710A-710C. In some instances, the coordinates of the APs 710A-710C may be relative to a reference position or coordinates (such as the position or coordinates of the first AP 710A). In other instances, the coordinates of the APs 710A-710C may be absolute coordinates (such as GPS or other satellite positioning system (SPS) coordinates).

In some aspects, the network entity 740 or the first AP 710A may obtain the signal propagation times based on the respective distances. For example, the signal propagation time $T_{AB}$ from the first AP to the second AP 710B may be obtained by dividing the distance between APs 710A and 710B by the speed of light c, and the signal propagation time $T_{AC}$ from the first AP to the third AP 710C may be obtained by dividing the distance between APs 710A and 710C by c. As discussed, in some implementations, such as when the APs 710A-710C are part of the same ESS or multiple BSSID set, the network entity 740 may be provided with the positions (such as the GPS coordinates) of the APs 710A-710C. In some aspects, the network entity 740 may determine, calculate, or otherwise obtain the respective distances $T_A$, $T_B$, and $T_C$ of the APs 710A-710C based on the respective positions or coordinates of the APs 710A-710C.

In some instances, the first AP 710A may obtain (e.g., determine, estimate, or calculate) the position of the STA 720 based at least in part on the time period $T_A$, the reported time delays $T_B$ and $T_C$, and the signal propagation times $T_{AB}$ and $T_{AC}$. In other instances, the first AP 710A may obtain (e.g., receive) the position of the STA 720 from the network entity 740. For example, the network entity 740 may estimate the location of the STA 720, and may send the coordinates associated with the estimated location to the first AP 710A over the backhaul connection 730.

In some implementations, at 838, the first AP 710A may enable or disable one or more services for the STA 720 based on the obtained position of the STA 720. Specifically, in some instances, the first AP 710A may enable services for the STA 720 while the STA 720 is located within a specified area or structure, and may disable the services when the STA is no longer located within the specified area or structure. For example, the first AP 710A may be associated with a hotel, and may allow the STA 720 to access the hotel's wireless network while the STA 720 is located within specified areas or sections of the hotel (such as the lobby, guestrooms, and pool, among other examples). When the STA 720 is no longer located within the specified areas or sections, or when is located within a restricted area or section of the hotel (such as the spa, employee areas, or storage areas, among other examples), the first AP 710A may disable the services. In some aspects, the first AP 710A may send an indication of the enabled or disabled services to the STA 720 in a fourth frame transmitted over the wireless medium.

In some instances, at 840, the first AP 710A may determine, calculate, or otherwise obtain the SIFS duration associated with the STA 720. In other instances, the first AP 710A may obtain the SIFS duration associated with the STA 720 from the network entity 740. In various aspects, the first AP 710A may send an indication of the SIFS duration to the STA 720 in a fifth frame transmitted over the wireless medium, at 842.

Figure 9:
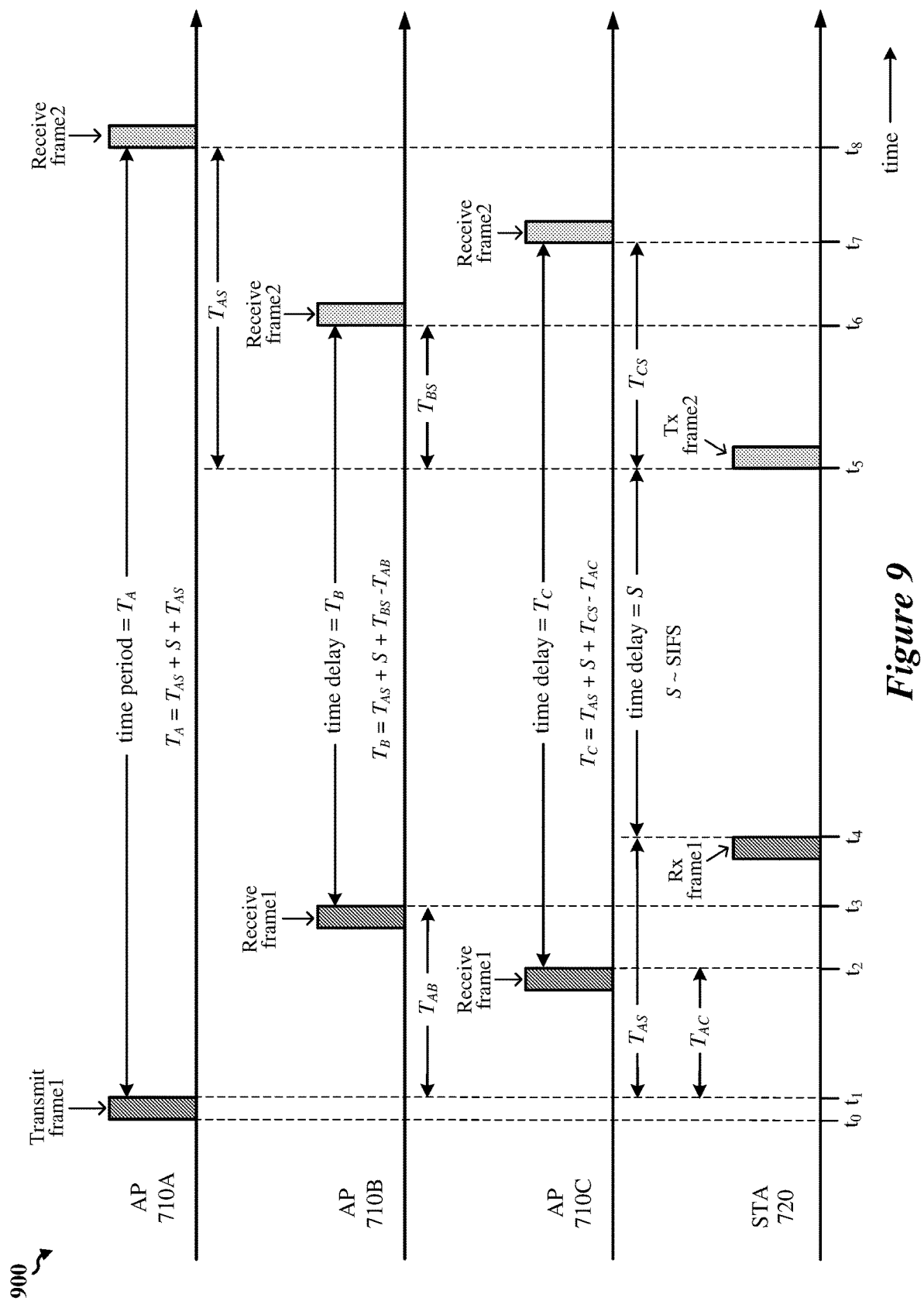
FIG. 9 shows a timing diagram of another example wireless communication that supports single-sided ranging operations.

FIG. 9 shows a timing diagram of an example wireless communication 900 that supports single-sided ranging operations. The wireless communication 900 may be associated with the STA 720 and the APs 710A, 710B, and 710C described with reference to FIG. 7. As discussed, the STA 720 and the first AP 710A are associated with each other, and the STA 720 is not associated with the second AP 710B or the third AP 710C. In the example of FIG. 9, the third AP 710C is closest to the first AP 710A, followed by the second AP 710B, and then the STA 720. As such, frames transmitted by the first AP 710A first arrive at the third AP 710C, then arrive at the second AP 710B, and then arrive at the STA 720. Also, the second AP 710B is closest to the STA 720, followed by the third AP 710C, and then the first AP 710A. As such, frames transmitted by the STA 720 first arrive at the second AP 710B, then arrive at the third AP 710C, and then arrive at the first AP 710A.

At time $t_0$, the first AP 710A begins transmitting the first frame over the wireless medium to the STA 720. As discussed, the first frame may be any suitable frame that elicits a response from the STA 720. At time $t_1$, a last symbol of the first frame is transmitted over the wireless medium, and the first AP 710A captures the first frame's TOD timestamp as $TOD_{F1,A}$. The end of the first frame arrives at the third AP 710C at time $t_2$, and the third AP 710C captures the second frame's TOA timestamp as $TOA_{F1,C}$. The time period between times $t_1$ and $t_2$ corresponds to the signal propagation time $T_{AC}$ between the first AP 710A and the third AP 710C, and indicates the distance DAC between the first AP 710A and the third AP 710C.

The end of the first frame arrives at the second AP 710B at time $t_3$, and the second AP 710B captures the second frame's TOA timestamp as $TOA_{F1,B}$. The time period between times $t_1$ and $t_3$ corresponds to the signal propagation time $T_{AB}$ between the first AP 710A and the second AP 710B, and indicates the distance $D_{AB}$ between the first AP 710A and the second AP 710B.

The end of the first frame arrives at the STA 720 at time $t_4$. The time period between times $t_1$ and $t_4$ corresponds to the signal propagation time $T_{AS}$ from the first AP 710A to the STA 720, and indicates the distance $D_{AS}$ between the first AP 710A and the STA 720. After a SIFS duration between times $t_4$ and $t_5$, the STA 720 transmits a second frame over the wireless medium to the first AP 710A, starting at time $t_5$. As discussed, in some instances, the first frame may be a QoS Null frame or an RTS frame, and the second frame may be an ACK frame responsive to the QoS Null frame or a CTS frame responsive to the RTS frame. In some other instances, the first frame may be one of an SU-PPDU or an MU PPDU transmitted over the entire bandwidth of the wireless channel, and the second frame may be an ACK frame or a BA frame received over the entire bandwidth of the wireless channel.

A start or beginning of the second frame arrives at the second AP 710B at time $t_6$, and the second AP 710B captures the second frame's TOA timestamp as $TOA_{F2,B}$. The time period between times $t_5$ and $t_6$ corresponds to the signal propagation time $T_{BS}$ from the STA 720 to the second AP 710B, and indicates the distance $D_{BS}$ between the STA 720 and the second AP 710B. The time period between times $t_3$ and $t_6$ corresponds to the time delay $T_B$ between respective receptions of the first frame and the second frame at the second AP 710B.

A start or beginning of the second frame arrives at the third AP 710C at time $t_7$, and the third AP 710C captures the second frame's TOA timestamp as $TOA_{F2,C}$. The time period between times $t_5$ and $t_7$ corresponds to the signal propagation time $T_{CS}$ from the STA 720 to the third AP 710C, and indicates the distance $D_{CS}$ between the STA 720 and the third AP 710C. The time period between times $t_2$ and $t_7$ corresponds to the time delay $T_C$ between respective receptions of the first frame and the second frame at the third AP 710C. Although not shown in FIG. 9 for simplicity, the second AP 710B and the third AP 710C may transmit indications of the respective time delays $T_B$ and $T_C$ to one or both of the first AP 710A or the network entity 740 over the wireless network or distribution system.

A start or beginning of the second frame arrives at the first AP 710A at time $t_8$, and the first AP 710A captures the second frame's TOA timestamp as $TOA_{F2,A}$. The time period between times $t_5$ and $t_8$ corresponds to the signal propagation time $T_{AS}$ from the STA 720 to the first AP 710A, and indicates the distance $D_{AS}$ between the STA 720 and the first AP 710A. The time period between times $t_1$ and $t_5$ corresponds to the time period $T_A$ between transmission of the first frame from the first AP 710A and reception of the second frame at the first AP 710A.

As depicted in FIG. 9, the time period $T_A$ may be measured as the time difference between timestamps $TOD_{F1,A}$ and $TOA_{F2,A}$ captured by the first AP 710A, and may be expressed as $T_A = T_{AS} + S + T_{AS}$, where S is the SIFS duration associated with the STA 720. The time delay $T_B$ may be measured as the time difference between timestamps $TOA_{F1,B}$ and $TOA_{F2,B}$ captured by the second AP 710B, and may be expressed as $T_B = T_{AS} + S + T_{BS} - T_{AB}$. The time delay $T_C$ may be measured as the time difference between timestamps $TOA_{F1,C}$ and $TOA_{F2,C}$ captured by the third AP 710C, and may be expressed as $T_C = T_{AS} + S + T_{CS} - T_{AC}$. As discussed, the values of $T_{AB}$ and $T_{AC}$ can be derived from the stored coordinates of the APs 710A-710C, thereby leaving four variables $T_{AS}$, $T_{BS}$, $T_{CS}$, and S associated with three equations.

Recognizing that obtaining the values of four variables requires four equations, aspects of the subject matter disclosed herein may incorporate quadratic expressions of the signal propagation times $T_{AS}$, $T_{BS}$, and $T_{CS}$ into the three expressions described above the time values of $T_A$, $T_B$, and $T_C$. Specifically, each of the signal propagation times $T_{AS}$, $T_{BS}$, and $T_{CS}$ may be expressed in terms of the coordinates $P_A$, $P_B$, $P_C$, and $P_S$ indicating the respective 2-dimensional positions of the first AP 710A, the second AP 710B, the third AP 710C, and the STA 720, respectively, by the following quadratic relationships:

$$T_{AS} = \sqrt{(P_A(x) - P_S(x))^2 + (P_A(y) - P_S(y))^2}/c,$$

$$T_{BS} = \sqrt{(P_B(x) - P_S(x))^2 + (P_B(y) - P_S(y))^2}/c, \text{ and}$$

$$T_{CS} = \sqrt{(P_C(x) - P_S(X))^2 + (P_C(y) - P_S(y))^2}/c,$$

where P(x) represents the x-axis coordinate of a respective device, and P(y) represents the y-axis coordinate of the respective device. For example, $P_A(x)$ may represent the x-axis coordinate of the first AP 710A, and $P_A(y)$ may represent the y-axis coordinate of the first AP 710A; $P_B(X)$ may represent the x-axis coordinate of the second AP 710B, and $P_B(y)$ may represent the y-axis coordinate of the second AP 710B; $P_C(x)$ may represent the x-axis coordinate of the third AP 710C, and $P_C(y)$ may represent the y-axis coordinate of the third AP 710C; $P_S(x)$ may represent the x-axis coordinate of the STA 720, and $P_S(y)$ may represent the y-axis coordinate of the STA 720. As discussed, in some implementations, such as when the APs 710A-710C are part of the same ESS or multiple BSSID set, the network entity 740 may be provided with the respective 2-dimensional coordinates $P_A(x)$, $P_A(y)$; $P_B(x)$, $P_B(y)$; and $P_C(x)$, $P_C(y)$ of the APs 710A-710C. In some aspects, the network entity 740 may determine, calculate, or otherwise obtain the signal propagation times $T_{AB}$, $T_{AC}$, and $T_BC$ between the APs 710A-710C based on their respective positions or coordinates. In some aspects, the network entity 740 provides one or both of the coordinates or signal propagation times of the APs 710A-710C to each of the first, second, and third APs 710A, 710B, and 710C.

Figure 10A:
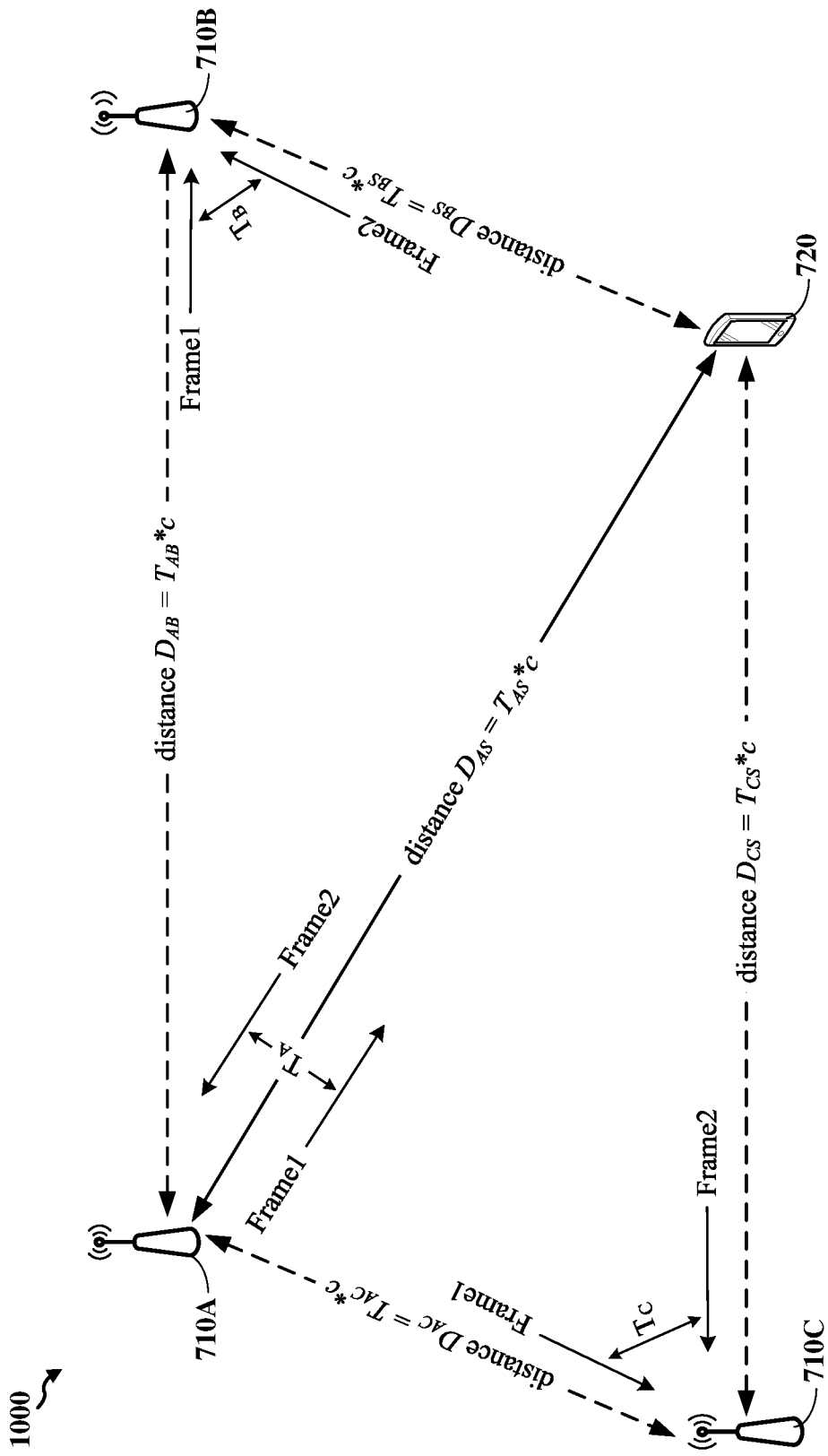
FIG. 10A shows an illustration depicting an example 2-dimensional positioning of a wireless device.

FIG. 10A shows an illustration 1000 depicting an example 2-dimensional positioning of a wireless device. The illustration 1000 shows the distances between the first AP 710A, the second AP 710B, the third AP 710C, and the STA 720 described with reference to FIGS. 7-9 relative to the respective signal propagation times between first AP 710A, the second AP 710B, the third AP 710C, and the STA 720. As shown, the signal propagation time between the first AP 710A and the STA 720 is $T_{AS}$, and the distance $D_{AS}$ between the first AP 710A and the STA 720 is $D_{AS} = T_{AS}*c$, where c is the speed of light. The signal propagation time between the second AP 710B and the STA 720 is $T_{BS}$, and the distance $D_{BS}$ between the second AP 710B and the STA 720 is $D_{BS} = T_{BS}*c$. The signal propagation time between the third AP 710C and the STA 720 is $T_{CS}$, and the distance $D_{CS}$ between the third AP 710C and the STA 720 is $D_{CS} = T_{CS}*c$.

In some instances, a relationship between the time period $T_A$ associated with the first AP 710A and a difference between position coordinates (P) of the first AP 710A and the STA 720 may be used as the fourth expression to obtain the distance between the first AP 710A and the STA 720. For example, in some aspects, position coordinates of the first AP 710A and the STA 720 may be inserted into the time delay expression for $T_A$ as follows:

$$T_A = \sqrt{(P_A(x) P_S(x))^2 + (P_A(y) - P_S(y))^2}/c + \sqrt{(P_A(x) - P_S(X))^2 + (P_A(y) - P_S(y))^2}/c + S.$$

Similarly, a relationship between the time period $T_B$ associated with the second AP 710B and a difference between position coordinates (P) of the second AP 710B and the STA 720 may be used as the fourth expression to obtain the distance between the second AP 710B and the STA 720. For example, in some aspects, position coordinates of the second AP 710B and the STA 720 may be inserted into the time delay expression for $T_B$ as follows:

$$T_B = \sqrt{(P_B(x)-P_S(x))^2+(P_B(y)-P_S(y))^2}/c + \sqrt{(P_B(x)-P_S(x))^2+(P_B(y)-P_S(y))^2}/c + S.$$

Similarly, a relationship between the time period $T_C$ associated with the third AP 710C and a difference between position coordinates (P) of the third AP 710C and the STA 720 may be used as the fourth expression to obtain the distance between the third AP 710C and the STA 720. For example, in some aspects, position coordinates of the third AP 710C and the STA 720 may be inserted into the time delay expression for $T_C$ as follows:

$$T_C = \sqrt{(P_C(x)-P_S(x))^2+(P_C(y)-P_S(y))^2}/c + \sqrt{(P_C(x)-P_S(x))^2+(P_C(y)-P_S(y))^2}/c + S.$$

By incorporating the quadratic expression relating signal propagation times to the coordinates of the APs 710A-710C into the time delay expressions, there are now four equations with which to solve for the four variables $T_{AS}$, $T_{BS}$, $T_{CS}$, and S, which can be solved by either the first AP 710A or the network entity 740.

In some implementations, one or both of the first AP 710A or the network entity 740 may use the respective relationships between the time delays and the coordinates of each of the APs 710A-710C, along with the coordinates of the APs 710A-710C, to determine, calculate, or otherwise obtain the position coordinates, and thus the location, of the STA 720. In some aspects, the obtained position coordinates of the STA 720 may be relative to the position coordinates of the first AP 710A. In some other aspects, the obtained position coordinates of the STA 720 may be absolute coordinates such as, for example, GPS coordinates.

Figure 10B:
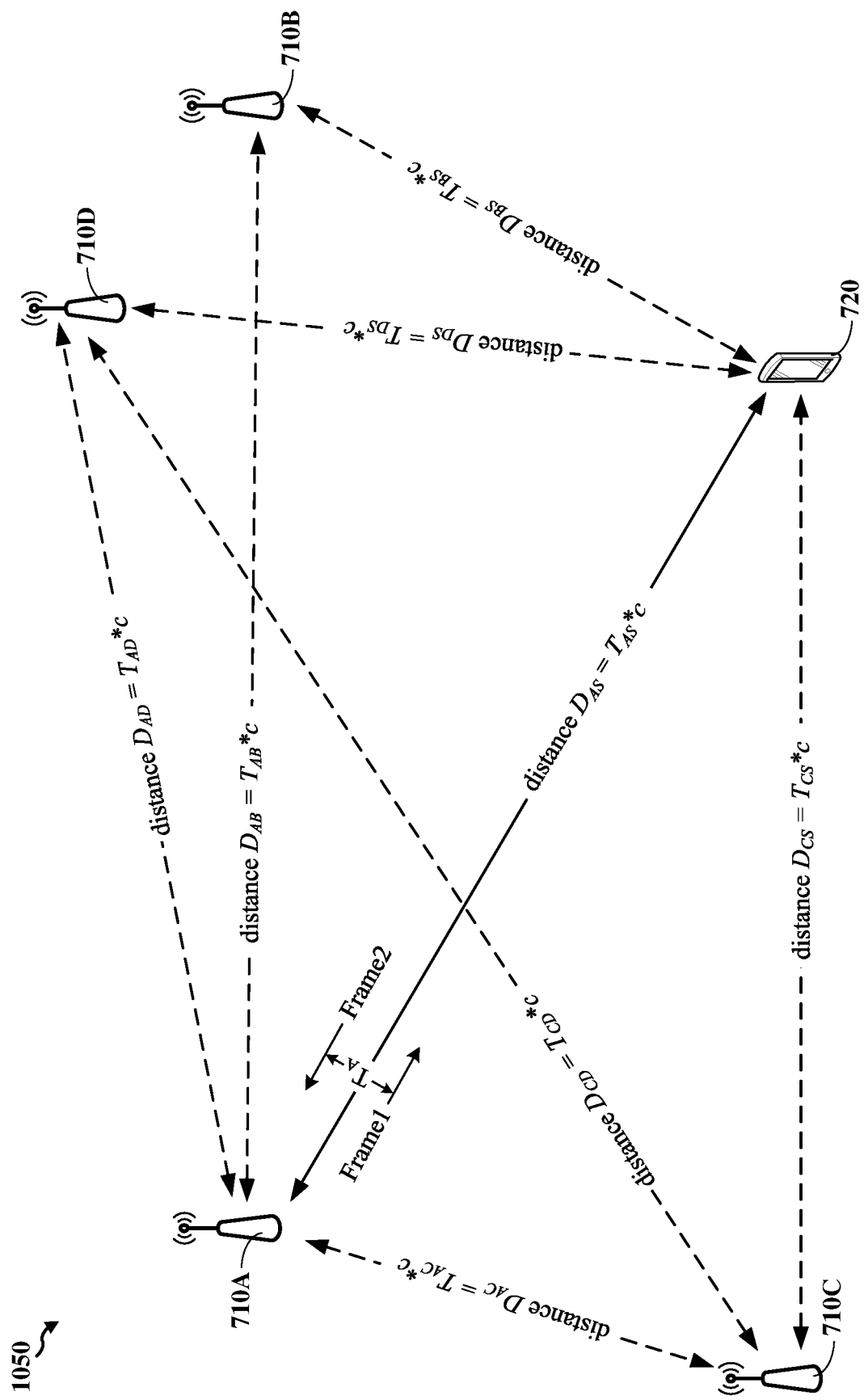
FIG. 10B shows an illustration depicting an example 3-dimensional positioning of a wireless device.

FIG. 10B shows an illustration 1050 depicting an example 3-dimensional positioning of a wireless device. The illustration 1050 indicates the distances between the first AP 710A, the second AP 710B, the third AP 710C, and the STA 720 of FIG. 10A, and also indicates the respective distances between a fourth AP 710D and each of the first AP 710A, the second AP 710B, the third AP 710C, and the STA 720. In the example of FIG. 10B, the STA 720, the first AP 710A, the second AP 710B, and the third AP 710C are located in the same plane as one another (e.g., the x-y place), and the fourth AP 710D is elevated (e.g., along a z-axis perpendicular to the x-y plane). For example, in some instances, the STA 720, the first AP 710A, the second AP 710B, and the third AP 710C may be located on the second floor of a building, and the fourth AP 710D may be located on the third floor of the building. In some aspects, the fourth AP 710D may be used to determine, calculate, or otherwise obtain the 3-dimensional position of the STA 720 (e.g., the 3-dimensional coordinates of the STA 720) based at least in part on TOA timestamps captured by the fourth AP 710D for the first and second frames described with reference to FIG. 8.

As discussed, the distance $D_{AS}$ between the first AP 710A and the STA 720 is $D_{AS}=T_{AS}*c$, where c is the speed of light. The signal propagation time between the second AP 710B and the STA 720 is $T_{BS}$, and the distance $D_{BS}$ between the second AP 710B and the STA 720 is $D_{BS}=T_{BS}*c$. The signal propagation time between the third AP 710C and the STA 720 is $T_{CS}$, and the distance $D_{CS}$ between the third AP 710C and the STA 720 is $D_{CS}=T_{CS}*c$. Referring also to FIG. 9, the time period $T_A$ may be measured as the time difference between timestamps $TOD_{F1,A}$ and $TOA_{F2,A}$ captured by the first AP 710A, and may be expressed as $T_A=T_{AS}+S+T_{AS}$, where S is the SIFS duration associated with the STA 720.

The time delay $T_B$ may be measured as the time difference between timestamps $TOA_{F1,B}$ and $TOA_{F2,B}$ captured by the second AP 710B, and may be expressed as $T_B=T_{AS}+S+T_{BS}-T_{AB}$. The time delay $T_C$ may be measured as the time difference between timestamps $TOA_{F1,C}$ and $TOA_{F2,C}$ captured by the third AP 710C, and may be expressed as $T_C=T_{AS}+S+T_{CS}-T_{AC}$.

The signal propagation time between the fourth AP 710D and the STA 720 is $T_{DS}$, and the distance $D_{DS}$ between the fourth AP 710D and the STA 720 is $D_{CS}=T_{CS}*c$. The signal propagation time between the fourth AP 710D and first AP 710A is $T_{AD}$, and the distance $D_{AD}$ between the fourth AP 710D and the first AP 710A is $D_{AD}=T_{AD}*c$. The signal propagation time between the fourth AP 710D and second AP 710B is $T_{BD}$, and the distance $D_{BD}$ between the fourth AP 710D and the second AP 710B is $D_{BD}=T_{BD}*c$. The signal propagation time between the fourth AP 710D and third AP 710C is $T_{CD}$, and the distance $D_{CD}$ between the fourth AP 710D and the third AP 710C is $D_{CD}=T_{CD}*c$.

In some implementations, the fourth AP 710D may capture the TOA timestamp of the first frame transmitted by the first AP 710 of FIG. 8 as $TOA_{F1,D}$, and may capture the TOA timestamp of the second frame transmitted by the STA 720 of FIG. 8 as $TOA_{F2,D}$. A time delay $T_D$ may be measured as the time difference between timestamps $TOA_{F1,D}$ and $TOA_{F2,D}$ captured by the fourth AP 710D, and may be expressed as $T_D=T_{DS}+S+T_{DS}-T_{DC}$.

Recognizing that obtaining the values of five variables requires four equations, aspects of the subject matter disclosed herein may incorporate quadratic expressions of the signal propagation times $T_{AS}$, $T_{BS}$, $T_{CS}$, and $T_{DS}$ into the three expressions described above the time values of $T_A$, $T_B$, $T_C$, and $T_D$. Specifically, each of the signal propagation times $T_{AS}$, $T_{BS}$, $T_{CS}$, and $T_{DS}$ may be expressed in terms of the coordinates $P_A$, $P_B$, $P_C$, $P_D$, and $P_S$ indicating the respective 3-dimensional positions of the first AP 710A, the second AP 710B, the third AP 710C, the fourth AP 710D, and the STA 720, respectively, by the following quadratic relationships:

$$T_{AS} = \sqrt{(P_A(x)-P_S(x))^2+(P_A(y)-P_S(y))^2+(P_A(z)-P_S(z))^2}/c,$$

$$T_{BS} = \sqrt{(P_B(x)-P_S(x))^2+(P_B(y)-P_S(y))^2+(P_B(z)-P_S(z))^2}/c,$$

$$T_{CS} = \sqrt{(P_C(x)-P_S(x))^2+(P_C(y)-P_S(y))^2+(P_C(z)-P_S(z))^2}/c,$$

and $$T_{DS} = \sqrt{(P_D(x)-P_S(x))^2+(P_D(y)-P_S(y))^2+(P_D(z)-P_S(z))^2}/c,$$

where P(x) represents the x-axis coordinate of a respective device, P(y) represents the y-axis coordinate of the respective device, and P(z) represents the z-axis coordinate of the respective device. For example, $P_A(x)$ may represent the x-axis coordinate of the first AP 710A, $P_A(y)$ may represent the y-axis coordinate of the first AP 710A, and $P_A(z)$ may represent the z-axis coordinate of the first AP 710A; $P_B(x)$ may represent the x-axis coordinate of the second AP 710B, $P_B(y)$ may represent the y-axis coordinate of the second AP 710B, and $P_B(z)$ may represent the z-axis coordinate of the second AP 710B; $P_C(x)$ may represent the x-axis coordinate of the third AP 710C, $P_C(y)$ may represent the y-axis coordinate of the third AP 710C, and $P_C(z)$ may represent the z-axis coordinate of the third AP 710C; $P_D(x)$ may represent the x-axis coordinate of the fourth AP 710D, $P_D(y)$ may represent the y-axis coordinate of the fourth AP 710D, and $P_D(z)$ may represent the z-axis coordinate of the fourth AP 710D; $P_S(x)$ may represent the x-axis coordinate of the STA 720, $P_S(y)$ may represent the y-axis coordinate of the STA 720, and $P_S(z)$ may represent the z-axis coordinate of the STA 720.

In some implementations, such as when the APs 710A-710D are part of the same ESS or multiple BSSID set, the network entity 740 may be provided with the respective 3-dimensional coordinates $P_A(x)$, $P_A(y)$, and $P_A(z)$ of the APs 710A-710D. In some aspects, the network entity 740 may determine, calculate, or otherwise obtain the signal propagation times $T_{AB}$, $T_{AC}$, TBC, $T_{AD}$, $T_{BD}$, and $T_{CD}$, between the APs 710A-710D based on their respective positions or coordinates. In some aspects, the network entity 740 provides one or both of the coordinates or signal propagation times of the APs 710A-710D to each of the first, second, third, and fourth APs 710A, 710B, 710C, and 710D.

In some instances, position coordinates of the first AP 710A and the STA 720 may be inserted into the time delay expression for $T_A$ as follows:

$$T_A = \sqrt{(P_A(x)-P_S(x))^2+(P_A(y)-P_S(y))^2+(P_A(z)-P_S(z))^2}/c+S+ \sqrt{(P_A(x)-P_S(x))^2+(P_A(y)-P_S(y))^2+(P_A(z)-P_S(z))^2}/c.$$

The position coordinates of the second AP 710B and the STA 720 may be inserted into the time delay expression for $T_B$ as follows:

$$T_B = \sqrt{(P_B(x)P_S(x))^2+(P_B(y)-P_S(y))^2+(P_B(z)-P_S(z))^2}/c+S+ \sqrt{(P_B(x)-P_S(x))^2+(P_B(y)-P_S(y))^2+(P_B(z)-P_S(z))^2}/c - T_{BS}.$$

The position coordinates of the third AP 710C and the STA 720 may be inserted into the time delay expression for $T_C$ as follows:

$$T_C = \sqrt{(P_C(x)-P_S(x))^2+(P_C(y)-P_S(y))^2+(P_C(z)-P_S(z))^2}/c+S+ \sqrt{(P_C(x)-P_S(x))^2+(P_C(y)-P_S(y))^2+(P_C(z)-P_S(z))^2}/c - T_{CS}.$$

The position coordinates of the fourth AP 710D and the STA 720 may be inserted into the time delay expression for $T_D$ as follows:

$$T_D = \sqrt{(P_D(x)-P_S(x))^2+(P_D(y)-P_S(y))^2+(P_D(z)-P_S(z))^2}/c+S+ \sqrt{(P_D(x)-P_S(x))^2+(P_D(y)-P_S(y))^2+(P_D(z)-P_S(z))^2}/c - T_{DS}.$$

By incorporating the quadratic expression relating signal propagation times to the coordinates of the APs 710A-710D into the time delay expressions, there are now five equations with which to solve for the five variables $T_{AS}$, $T_{BS}$, $T_{CS}$, $T_{DS}$, and S, which can be solved by either the first AP 710A or the network entity 740.

In some implementations, one or both of the first AP 710A or the network entity 740 may use the respective relationships between the time delays and the coordinates of each of the APs 710A-710D, along with the coordinates of the APs 710A-710D, to determine, calculate, or otherwise obtain the position coordinates, and thus the location, of the STA 720. In some aspects, the obtained position coordinates of the STA 720 may be relative to the position coordinates of the first AP 710A. In some other aspects, the obtained position coordinates of the STA 720 may be absolute coordinates such as, for example, GPS coordinates.

Figure 11:
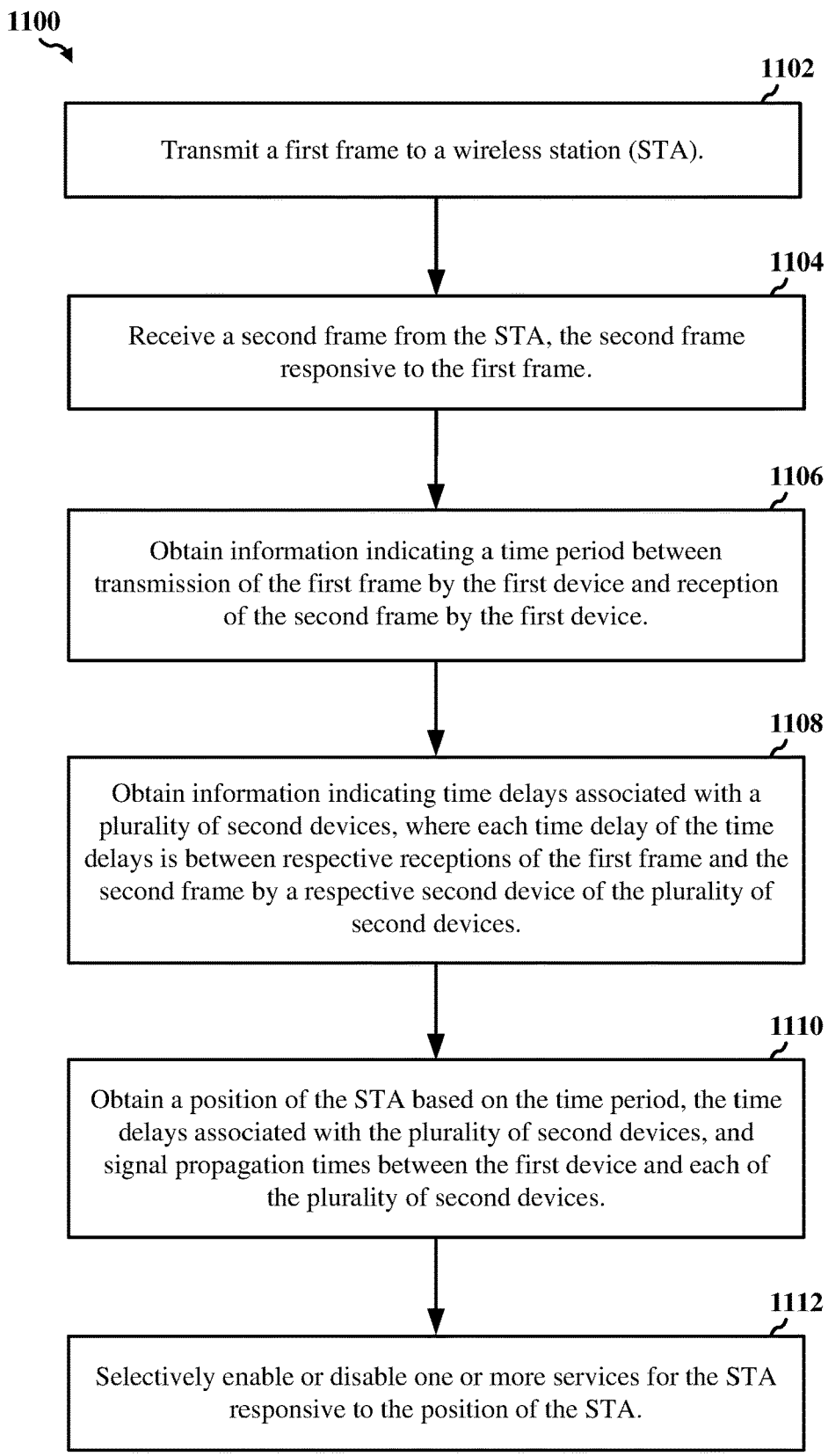
FIGS. 11-16 show flowcharts illustrating example operations for wireless communications that support single-sided ranging operations.

FIG. 11 shows a flowchart illustrating an example operation 1100 for wireless communication that supports single-sided ranging operations. The operation 1100 may be performed by a wireless communication device such as the wireless communication device 500 described above with reference to FIG. 5. In various implementations, the operation 1100 may be performed by a first device operating as or within an AP, such as one of the APs 102 or 602 described with reference to FIGS. 1 and 6B, respectively. In some instances, the operation 1100 may be performed by the first AP 710A described with reference to FIGS. 7-9.

For example, at 1102, the first device transmits a first frame to a wireless station (STA). At 1104, the first device receives a second frame from the STA, the second frame responsive to the first frame. At 1106, the first device obtains information indicating a time period between transmission of the first frame by the first device and reception of the second frame by the first device. At 1108, the first device obtains information indicating time delays associated with a plurality of second devices, where each time delay of the time delays is between respective receptions of the first frame and the second frame by a respective second device of the plurality of second devices. At 1110, the first device obtains a position of the STA based on the time period, the time delays associated with the plurality of second devices, and signal propagation times between the first device and each of the plurality of second devices. At 1112, the first device selectively enables or disables one or more services for the STA responsive to the position of the STA.

In various implementations, the position of the STA may be obtained independently of time periods or time delays associated with the STA. In this way, the position of the STA may be obtained without estimating SIFS durations associated with the STA, which may increase the accuracy with which the position of the STA can be estimated, determined, or otherwise obtained. Also, by not relying on time periods or time delays associated with a STA to obtain the position of the STA, implementations of the subject matter disclosed herein do not receive any measurements from the STA for positioning, which as discussed may reduce the amount of overhead or congestion associated with frame exchanges on a shared wireless medium.

In some implementations, the first frame may be a Quality of Service (QoS) Null frame or a Ready-to-Send (RTS) frame, and the second frame may be an acknowledgement (ACK) frame responsive to the QoS Null frame, or may be a Clear-to-Send (CTS) frame responsive to the RTS frame. In some other implementations, the first frame may be one of a single-user (SU) physical layer protocol data unit (PPDU) or a multi-user (MU) PPDU transmitted over an entire bandwidth of a wireless channel, and the second frame may be an acknowledgement (ACK) frame or a block ACK (BA) frame received over the entire bandwidth of the wireless channel.

In some implementations, the time period may be associated with an end of the transmission of the first frame and a start of the reception of the second frame at the first device. In some instances, each of the time delays may be associated with an end of the reception of the first frame and a start of the reception of the second frame by a respective second device. In some other implementations, the time period may be equal to a sum of a signal propagation time from the first device to the STA, a SIFS duration associated with the STA, and a signal propagation time from the STA to the first device. In some instances, the time delay associated with a respective second device may be equal to a sum of the signal propagation time from the first device to the STA, the SIFS duration associated with the STA, and a signal propagation time from the STA to the respective second device, minus a signal propagation time from the first device to the second device.

Figure 12:
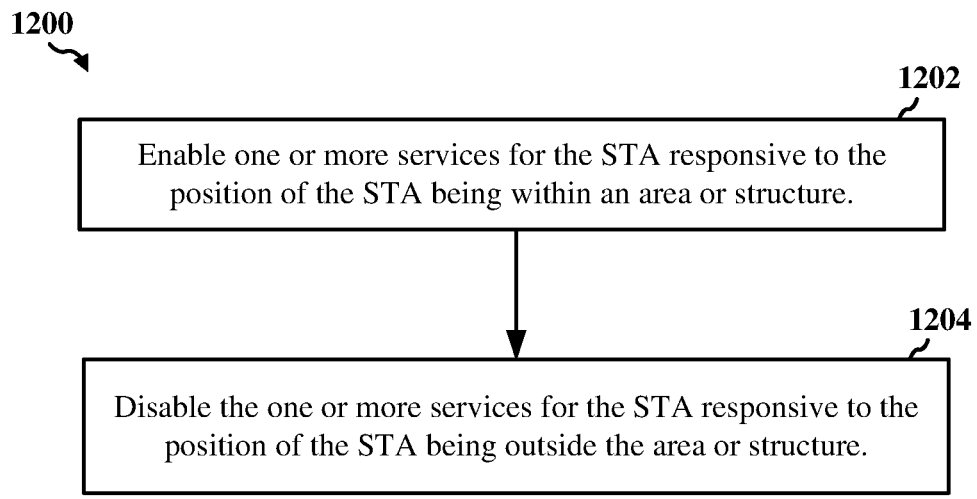

FIG. 12 shows a flowchart illustrating an example operation 1200 for wireless communication that supports single-sided ranging operations. The operation 1200 may be performed by a wireless communication device such as the wireless communication device 500 described above with reference to FIG. 5. In various implementations, the operation 1200 may be performed by a first device operating as or within an AP, such as one of the APs 102 or 602 described with reference to FIGS. 1 and 6B, respectively. In some aspects, the operation 1200 may be performed by the first AP 710A described with reference to FIGS. 7-9.

In some instances, the operation 1200 may be one example of selectively enabling or disabling the one or more services at 1112 of FIG. 11. For example, at 1202, the first device enables one or more services for the STA responsive to the position of the STA being within an area or structure. At 1204, the first device disables the one or more services for the STA responsive to the position of the STA being outside the area or structure. In some implementations, the first device may enable the one or more services for the STA when the STA is located within an area or structure, and may continue enabling the one or more services as long as the STA remains within the area or structure. For example, the first device may be associated with a hotel, and may allow the STA to access the hotel's wireless network while the STA is located within specified areas or sections of the hotel (such as the lobby, guestrooms, and pool, among other examples). In some instances, the first device may send an indication of the enabled services to the STA in a frame transmitted over the wireless medium. When the STA is no longer located within the specified areas or sections, or when the STA is located within a restricted area or section of the hotel (such as the spa, employee areas, or storage areas, among other examples), the first device may disable the services provided to the STA.

Figure 13:
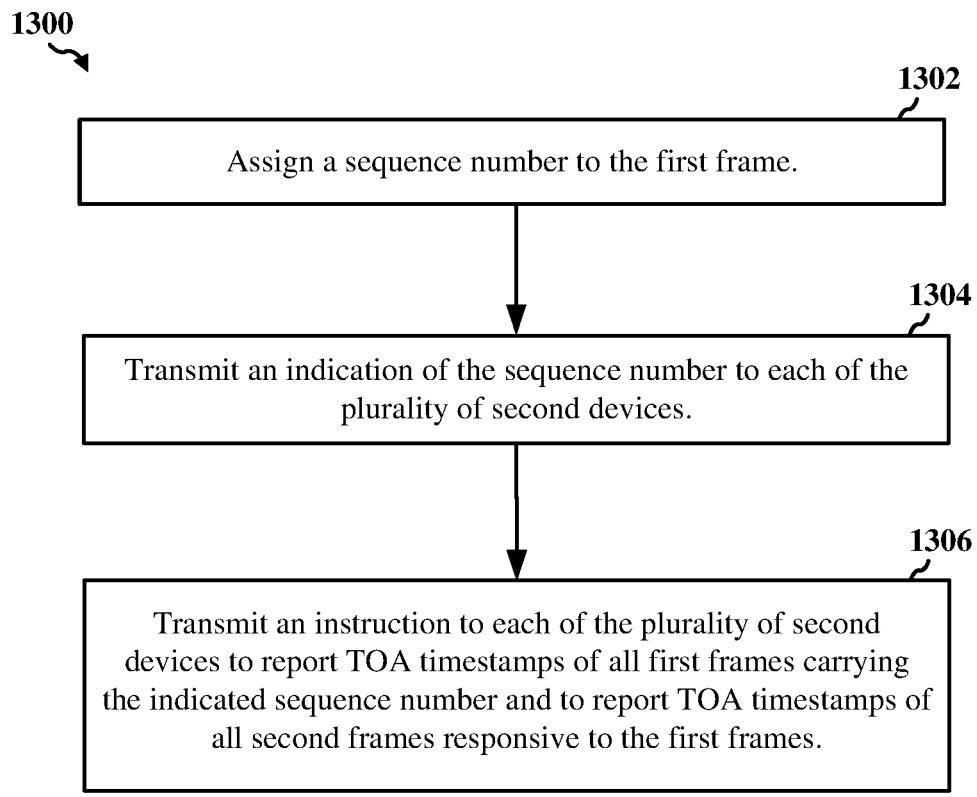

FIG. 13 shows a flowchart illustrating an example operation 1300 for wireless communication that supports single-sided ranging operations. The operation 1300 may be performed by a wireless communication device such as the wireless communication device 500 described above with reference to FIG. 5. In various implementations, the operation 1300 may be performed by a first device operating as or within an AP, such as one of the APs 102 or 602 described with reference to FIGS. 1 and 6B, respectively. In some aspects, the operation 1300 may be performed by the first AP 710A described with reference to FIGS. 7-9.

In some instances, the operation 1300 may be performed in conjunction with the operation 1100 of FIG. 11. For example, at 1302, the first device assigns a sequence number to the first frame. At 1304, the first device transmits an indication of the sequence number to each of the plurality of second devices. At 1306, the first device transmits an instruction to each of the plurality of second devices to report time-of-arrival (TOA) timestamps of all first frames carrying the indicated sequence number and to report TOA timestamps of all second frames transmitted over the wireless medium in response to the first frames. In other implementations, the presence of the assigned sequence number in the first frames may be an implicit instruction for the second devices to capture TOA timestamps of the first frames, to capture TOA timestamps of other frames transmitted in response to the first frames, and to report the captured TOA timestamps to one or both of the first device or the network entity.

In some implementations, the assigned sequence number may be a unique or selected value indicating that the first frame is associated with a ranging operation. In some instances, the indication may be transmitted to each of the second devices in a suitable management frame, control frame, or action frame. In other instances, the indication may be sent to each of the second devices over a backhaul connection. In some other instances, the indication may be sent to each of the second devices by the network entity described with reference to FIG. 7.

Figure 14:
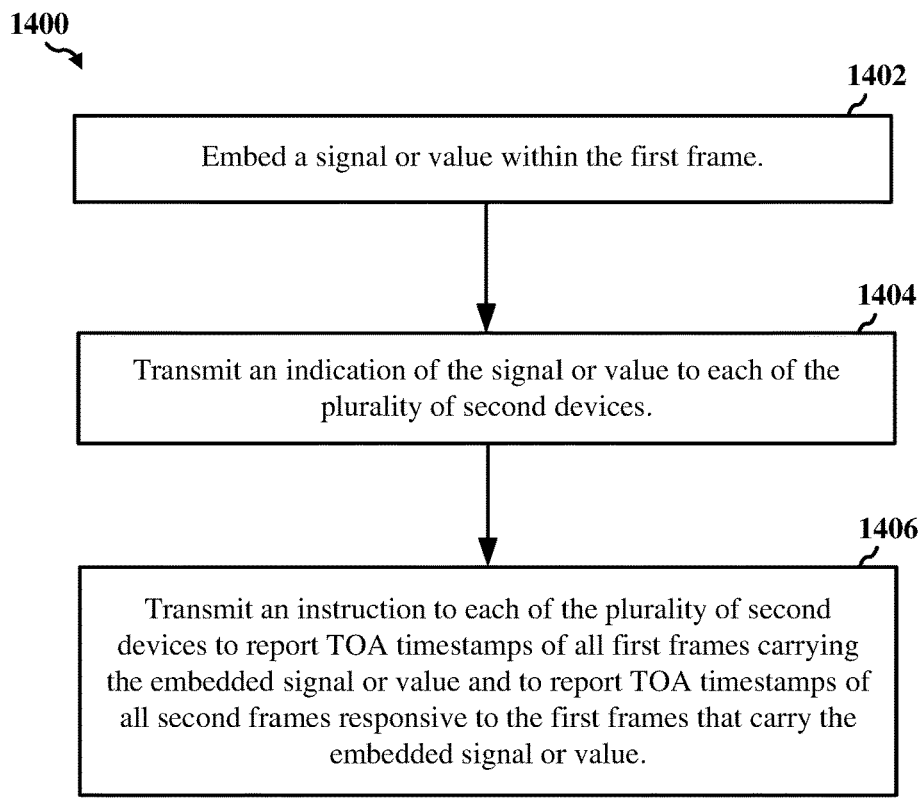

FIG. 14 shows a flowchart illustrating an example operation 1400 for wireless communication that supports single-sided ranging operations. The operation 1400 may be performed by a wireless communication device such as the wireless communication device 500 described above with reference to FIG. 5. In various implementations, the operation 1400 may be performed by a first device operating as or within an AP, such as one of the APs 102 or 602 described with reference to FIGS. 1 and 6B, respectively. In some aspects, the operation 1400 may be performed by the first AP 710A described with reference to FIGS. 7-9.

In some instances, the operation 1400 may be performed in conjunction with the operation 1100 of FIG. 11. For example, at 1402, the first device embeds a signal or value within the first frame. At 1404, the first device transmits an indication of the signal or value to each of the plurality of second devices. At 1406, the first device transmits an instruction to each of the plurality of second devices to report time-of-arrival (TOA) timestamps of all first frames carrying the embedded signal or value and to report TOA timestamps of all second frames responsive to the first frames that carry the embedded signal or value. In other implementations, the presence of the embedded signal or value in the first frames may be an implicit instruction for the second devices to capture TOA timestamps of the first frames, to capture TOA timestamps of other frames transmitted in response to the first frames, and to report the captured TOA timestamps to one or both of the first device or the network entity.

In some implementations, the embedded signal or value may be indicated by one of a reserved or unused bit of a preamble of the first frame, a reserved or unused bit of a MAC header of the first frame, or a reserved or unused bit of an element, field, or subfield following the MAC header of the first frame. In some instances, the indication may be transmitted to each of the second devices in a suitable management frame, control frame, or action frame. In other instances, the indication may be sent to each of the second devices over a backhaul connection. In some other instances, the indication may be sent to each of the second devices by the network entity described with reference to FIG. 7.

In other implementations, the AP 710A may not send indications of the frames for which the second AP 710B and the third AP 710C are to capture TOA timestamps. For example, in some instances, the second AP 710B and the third AP 710C may capture TOA timestamps of frames received from a specific AP or STA during a window of time. In other instances, the second AP 710B and the third AP 710C may capture TOA timestamps of all frames received during the window of time. In some other instances, the second AP 710B and the third AP 710C may capture TOA timestamps of frames exchanged between specific APs and specific STAs (e.g., during the window of time).

Figure 15:
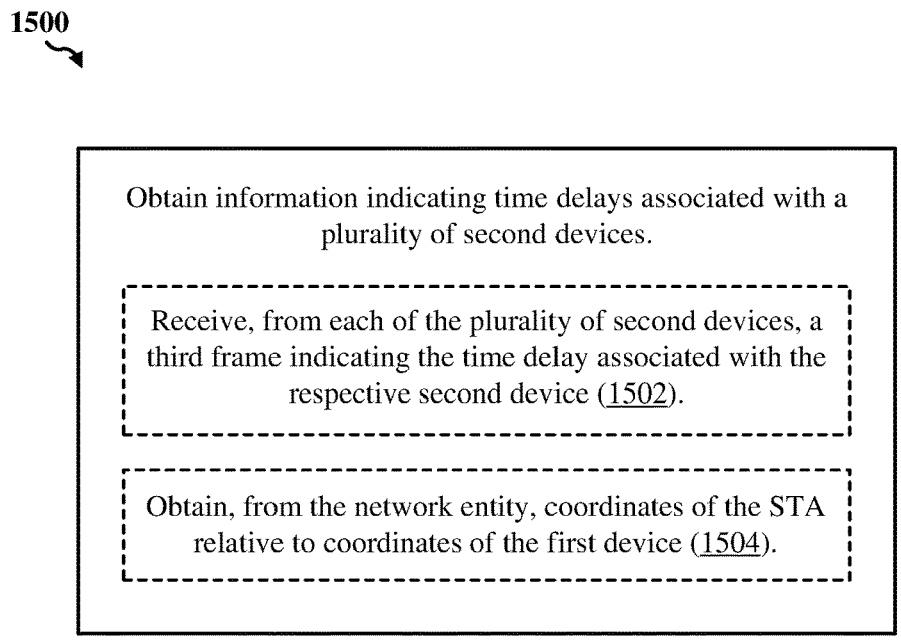

FIG. 15 shows a flowchart illustrating an example operation 1500 for wireless communication that supports single-sided ranging operations. The operation 1500 may be performed by a wireless communication device such as the wireless communication device 500 described above with reference to FIG. 5. In various implementations, the operation 1500 may be performed by a first device operating as or within an AP, such as one of the APs 102 or 602 described with reference to FIGS. 1 and 6B, respectively. In some aspects, the operation 1500 may be performed by the first AP 710A described with reference to FIGS. 7-9.

In some instances, the operation 1500 may be one example of obtaining the information indicating the time delays associated with the plurality of second devices at 1108 of FIG. 11. For example, in some aspects, the first device receives, from each of the plurality of second devices, a third frame indicating the time delay associated with the respective second device, at 1502. In other aspects, the first device obtains coordinates of the STA relative to coordinates of the first device from the network entity, at 1504.

Figure 16:
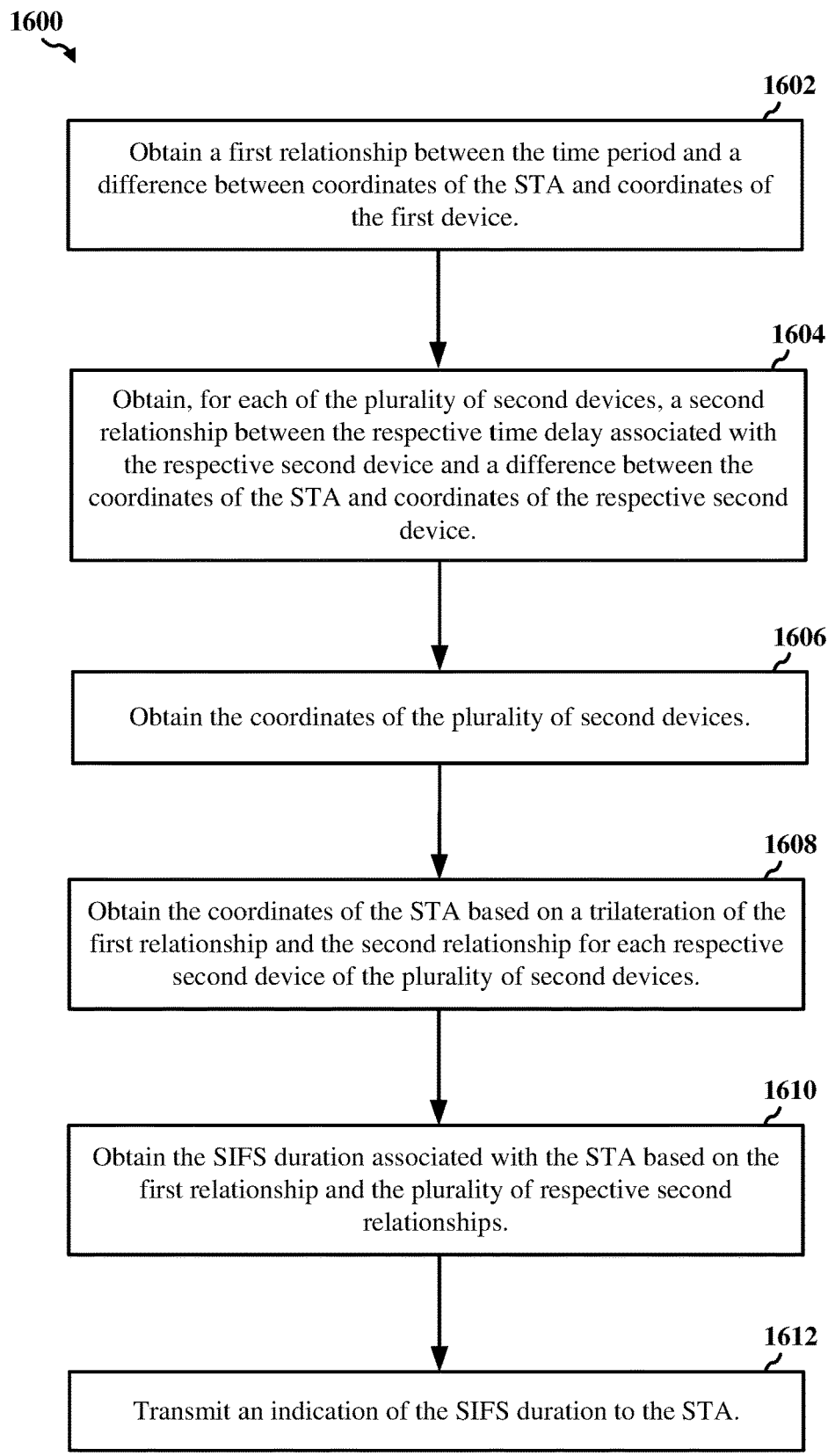

FIG. 16 shows a flowchart illustrating an example operation 1600 for wireless communication that supports single-sided ranging operations. The operation 1600 may be performed by a wireless communication device such as the wireless communication device 500 described above with reference to FIG. 5. In various implementations, the operation 1600 may be performed by a first device operating as or within an AP, such as one of the APs 102 or 602 described with reference to FIGS. 1 and 6B, respectively. In some aspects, the operation 1600 may be performed by the first AP 710A described with reference to FIGS. 7-9.

In some instances, the operation 1600 may be one example of obtaining the position of the STA at 1110 of FIG. 11. For example, at 1602, the first device obtains a first relationship between the time period and a difference between coordinates of the STA and coordinates of the first device. At 1604, the first device obtains, for each of the plurality of second devices, a second relationship between the respective time delay associated with the respective second device and a difference between the coordinates of the STA and coordinates of the respective second device. At 1606, the first device obtains the coordinates of the plurality of second devices. At 1608, the first device obtains the coordinates of the STA based on a trilateration of the first relationship and the second relationship for each respective second device of the plurality of second devices.

In some implementations, the example operation 1600 may continue. For example, at 1610, the first device obtains the SIFS duration associated with the STA based on the first relationship and the plurality of respective second relationships. At 1612, the first device transmits an indication of the SIFS duration to the STA. As discussed, the time period may be equal to a sum of a signal propagation time from the first device to the STA, a SIFS duration associated with the STA, and a signal propagation time from the STA to the first device. The time delay associated with a respective second device may be equal to a sum of the signal propagation time from the first device to the STA, the SIFS duration associated with the STA, and a signal propagation time from the STA to the respective second device, minus a signal propagation time from the first device to the second device.

Figure 17:
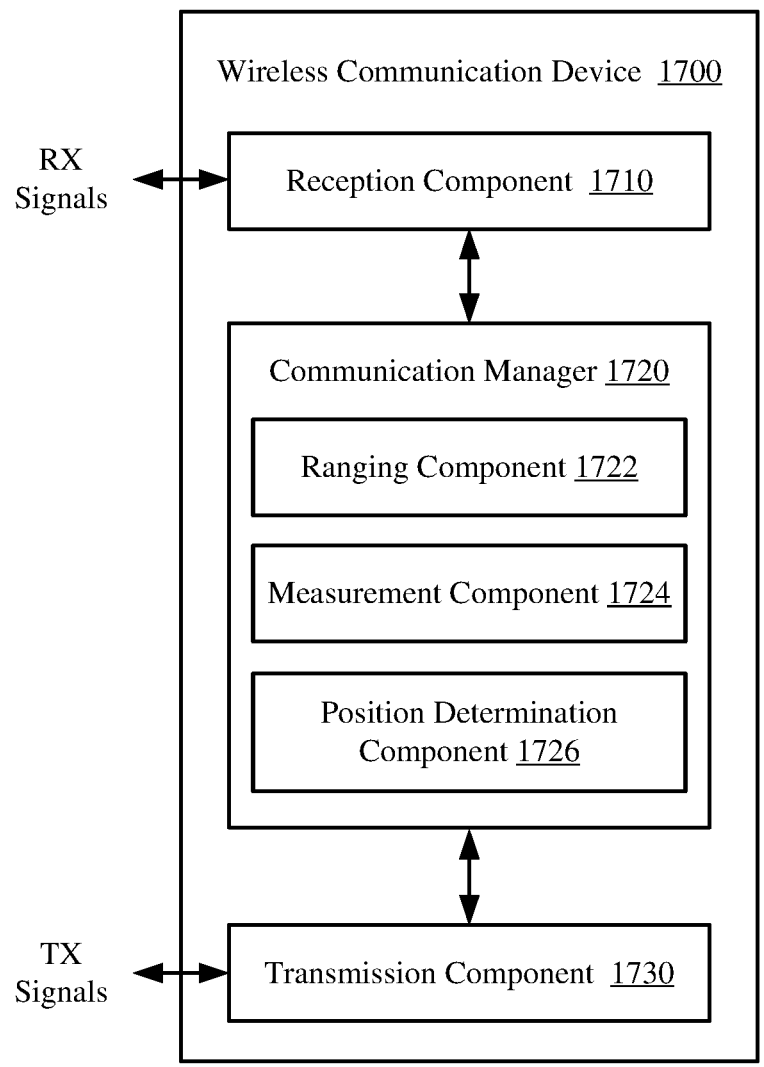
FIG. 17 shows a block diagram of an example wireless communication device, according to some implementations.

FIG. 17 shows a block diagram of an example wireless communication device 1700. In some implementations, the wireless communication device 1700 may be configured to perform one or more of the operations 1100, 1200, 1300, 1400, 1500, or 1600 described above with reference to FIGS. 11, 12, 13, 14, 15, and 16, respectively. The wireless communication device 1700 can be an example implementation of any of the APs 102 of FIG. 1, the wireless communication device 500 of FIG. 5, the AP 602 of FIG. 6A, or the first AP 710A described with reference to FIGS. 7-9. More specifically, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 includes a Ranging component 1722, a Measurement component 1724, and a Position Determination component 1726. Portions of one or more of the components 1722, 1724, and 1726 may be implemented at least in part in hardware or firmware. In some implementations, one or more of the components 1722, 1724, and 1726 may be implemented at least in part as software stored in a memory (such as the memory 508 of FIG. 5). For example, portions of one or more of the components 1724 or 1726 can be implemented as non-transitory instructions (or "code") executable by a processor (such as the processor 506 of FIG. 5) to perform the functions or operations of the respective component. In some other implementations, the Position Determination component 1726 may reside in the network entity 740.

The transmission component 1730 is configured to transmit TX signals to one or more other wireless communication devices. For example, in some instances, the transmission component 1730 may be configured to transmit a first frame to a STA to facilitate ranging of the STA. The transmission component 1730 may also be configured to transmit indications of sequence numbers assigned to the first frame or a signal or value embedded within the first frame. In some instances, the transmission component 1730 may be configured to transmit instructions for nearby passive listening devices to capture TOA timestamps of the first frame, to capture TOA timestamps of other frames transmitted in response to the first frame, and to report the captured TOA timestamps to one or both of the wireless communication device 1700 or the network entity described with reference to FIG. 7. In other instances, the transmission component 1730 may be configured to transmit an indication of a SIFS duration to the STA.

The reception component 1710 is configured to receive RX signals from one or more other wireless communication devices. In some instances, the reception component 1710 may be configured to receive a second frame, transmitted by the STA, responsive to the first frame. The reception component 1710 may also be configured to obtain information indicating time delays associated with each of the nearby passive listening devices, where each time delay of the time delays is between respective receptions of the first frame and the second frame by a respective one of the nearby passive listening devices.

The communication manager 1720 is configured to manage wireless communications with other wireless communication devices. In some implementations, the Ranging component 1722 may assign a sequence number to, or embed a signal or value within, the first frame transmitted to the STA. The assigned sequence number or embedded signal may indicate that the first frame is associated with a ranging operation with the STA. The Measurement component 1724 may be configured to obtain information indicating a time period between transmission of the first frame by the wireless communication device 1700 and reception of the second frame by the wireless communication device 1700. In some instances, the Measurement component 1724 may also be configured to obtain the time delays associated with the nearby passive listening devices. In some aspects, the Measurement component 1724 may also be configured to obtain the SIFS duration associated with the STA. The Position Determination component 1726 may be configured to obtain a position of the STA based on the time period, the time delays associated with the nearby passive listening devices, and signal propagation times between the first device and each of the nearby passive listening devices.

In certain configurations, the wireless communication device 1700 may include means for all means limitations described herein. In some instances, the aforementioned means may be one or more of the modem 502, the radio 504, the processor(s) 506, or the memory 508 of FIG. 5. In some instances, the aforementioned means may be one or more of the memory 640, the application processor 630, the WCD 610, or the antennas 620 of FIG. 6A. In some other instances, the aforementioned means may be one or more of the aforementioned components 1722, 1724, and 1726 of the wireless communication device 1700 of FIG. 17.

In some examples, the means for transmitting the first frame may include the modem 502 and the radio 504 of FIG. 5, the WCD 610 and the antennas 620 of FIG. 6A, or the transmission component 1730 of FIG. 17. In some examples, the means for receiving a second frame from the STA may include the modem 502 and the radio 504 of FIG. 5, the WCD 610 and the antennas 620 of FIG. 6A, or the reception component 1710 of FIG. 17. In some examples, the means for obtaining information indicating the time period may include the processor(s) 506 and the memory 508 of FIG. 5, the memory 640, the application processor 630, and the WCD 610 of FIG. 6A, or the position determination component 1726 of FIG. 17. In some examples, the means for obtaining information indicating time delays may include the modem 502 and the radio 504 of FIG. 5, the WCD 610 and the antennas 620 of FIG. 6A, or the reception component 1710 of FIG. 17. In some examples, the means for obtaining the position of the STA may include the processor(s) 506 and the memory 508 of FIG. 5, the memory 640, the application processor 630, and the WCD 610 of FIG. 6A, or the position determination component 1726 of FIG. 17.

Example Aspects

Aspect 1: A first device, including at least one processor and at least one memory communicatively coupled with the at least one processor and storing processor-readable code that, when executed by the at least one processor, is configured to transmit a first frame to a wireless station (STA); to receive a second frame from the STA, the second frame responsive to the first frame; to obtain information indicating a time period between transmission of the first frame by the first device and reception of the second frame by the first device; to obtain information indicating time delays associated with a plurality of second devices, where each time delay of the time delays is between respective receptions of the first frame and the second frame by a respective second device of the plurality of second devices; and to obtain a position of the STA based on the time period, the time delays associated with the plurality of second devices, and signal propagation times between the first device and each of the plurality of second devices.

Aspect 2: The first device of Aspect 1, where execution of the processor-readable code is further configured to enable one or more services for the STA responsive to the position of the STA being within an area or structure; or to disable the one or more services for the STA responsive to the position of the STA being outside the area or structure.

Aspect 3: The first device of any one or more of Aspects 1-2, where the first frame includes a Quality of Service (QoS) Null frame or a Ready-to-Send (RTS) frame, and the second frame includes an acknowledgement (ACK) frame responsive to the QoS Null frame or a Clear-to-Send (CTS) frame responsive to the RTS frame.

Aspect 4: The first device of any one or more of Aspects 1-2, where the first frame includes one of a single-user (SU) physical layer protocol data unit (PPDU) or a multi-user (MU) PPDU transmitted over an entire bandwidth of a wireless channel, and the second frame includes an acknowledgement (ACK) frame or a block ACK (BA) frame received over the entire bandwidth of the wireless channel.

Aspect 5: The first device of any one or more of Aspects 1-4, where the first device includes a first access point (AP) associated with the STA, and the plurality of second devices includes a plurality of respective passive listening devices not associated with the STA.

Aspect 6: The first device of Aspect 5, where execution of the processor-readable code to obtain the time delays is further configured to receive, from each of the plurality of second devices, a third frame indicating a respective time delay associated with the respective second device.

Aspect 7: The first device of any one or more of Aspects 1-5, where one or both of the information indicating the time delays associated with the plurality of second devices or the information indicating position of the STA is obtained from a network entity.

Aspect 8: The first device of Aspect 7, where execution of the processor-readable code to obtain the position of the STA is further configured to obtain, from the network entity, coordinates of the STA relative to coordinates of the first device.

Aspect 9: The first device of any one or more of Aspects 1-8, where execution of the processor-readable code is further configured to assign a sequence number to the first frame; to transmit an indication of the sequence number to each of the plurality of second devices; and to transmit an instruction to each of the plurality of second devices to report time-of-arrival (TOA) timestamps of all first frames carrying the indicated sequence number and to report TOA timestamps of all second frames responsive to the first frames.

Aspect 10: The first device of any one or more of Aspects 1-9, where the position of the STA is obtained independently of time periods or time delays associated with the STA.

Aspect 11: The first device of any one or more of Aspects 1-10, where the time period is associated with an end of the transmission of the first frame and a start of the reception of the second frame; and each of the time delays is associated with an end of the reception of the first frame and a start of the reception of the second frame by the respective second device of the plurality of second devices.

Aspect 12: The first device of any one or more of Aspects 1-11, where the time period is equal to a sum of a signal propagation time from the first device to the STA, a Short Inter-Frame Spacing (SIFS) duration associated with the STA, and a signal propagation time from the STA to the first device; and a respective time delay associated with a respective second device is equal to a sum of the signal propagation time from the first device to the STA, the SIFS duration associated with the STA, and a signal propagation time from the STA to the respective second device, minus a signal propagation time from the first device to the second device.

Aspect 13: The first device of Aspect 12, where execution of the processor-readable code to obtain the position of the STA is further configured to obtain a first relationship between the time period and a difference between coordinates of the STA and coordinates of the first device; to obtain, for each of the plurality of second devices, a second relationship between the respective time delay associated with the respective second device and a difference between the coordinates of the STA and coordinates of the respective second device; obtain the coordinates of the plurality of second devices; and to obtain the coordinates of the STA based on a trilateration of the first relationship and the second relationship for each respective second device of the plurality of second devices.

Aspect 14: The first device of Aspect 13, where execution of the processor-readable code is further configured to obtain the SIFS duration associated with the STA based on the first relationship and the second relationship for each respective second device of the plurality of second devices; and to transmit an indication of the SIFS duration to the STA.

Aspect 15: The first device of any one or more of Aspects 1-14, where execution of the processor-readable code is further configured to embed a signal or value within the first frame; to transmit an indication of the signal or value to each of the plurality of second devices; and to transmit an instruction to each of the plurality of second devices to report time-of-arrival (TOA) timestamps of all first frames carrying the embedded signal or value and to report TOA timestamps of all second frames responsive to the first frames that carry the embedded signal or value.

Aspect 16: The first device of Aspect 15, where the embedded signal or value is indicated by one of a reserved or unused bit of a preamble of the first frame, a reserved or unused bit of a medium access control (MAC) header of the first frame, or a reserved or unused bit of an element, field, or subfield following the MAC header of the first frame.

Aspect 17: A method for wireless communications by a first device, including transmitting a first frame to a wireless station (STA); receiving a second frame from the STA, the second frame responsive to the first frame; obtaining information indicating a time period between transmission of the first frame by the first device and reception of the second frame by the first device; obtaining information indicating time delays associated with a plurality of second devices, where each time delay of the time delays is between respective receptions of the first frame and the second frame by a respective second device of the plurality of second devices; and obtaining a position of the STA based on the time period, the time delays associated with the plurality of second devices, and signal propagation times between the first device and each of the plurality of second devices.

Aspect 18: The method of Aspect 17, further including enabling one or more services for the STA responsive to the position of the STA being within an area or structure; or disabling the one or more services for the STA responsive to the position of the STA being outside the area or structure.

Aspect 19: The method of any one or more of Aspects 17-18, where the first frame includes a Quality of Service (QoS) Null frame or a Ready-to-Send (RTS) frame, and the second frame includes an acknowledgement (ACK) frame responsive to the QoS Null frame or a Clear-to-Send (CTS) frame responsive to the RTS frame.

Aspect 20: The method of any one or more of Aspects 17-18, where the first frame includes one of a single-user (SU) physical layer protocol data unit (PPDU) or a multi-user (MU) PPDU transmitted over an entire bandwidth of a wireless channel, and the second frame includes an acknowledgement (ACK) frame or a block ACK (BA) frame received over the entire bandwidth of the wireless channel.

Aspect 21: The method of any one or more of Aspects 17-20, where the first device includes a first access point (AP) associated with the STA, and the plurality of second devices include a plurality of respective passive listening devices not associated with the STA.

Aspect 22: The method of Aspect 21, where obtaining the time delays includes receiving, from each of the plurality of second devices, a third frame indicating a respective time delay associated with the respective second device.

Aspect 23: The method of any one or more of Aspects 17-22, where the first device includes a network entity, one of the second devices includes a first access point (AP) associated with the STA, and the other second devices include respective second APs not associated with the STA.

Aspect 24: The method of Aspect 23, where obtaining the position of the STA includes receiving, from the network entity, coordinates of the STA relative to coordinates of the first device.

Aspect 25: The method of any one or more of Aspects 17-24, further including assigning a sequence number to the first frame; transmitting an indication of the sequence number to each of the plurality of second devices; and transmitting an instruction to each of the plurality of second devices to report time-of-arrival (TOA) timestamps of all first frames carrying the indicated sequence number and to report TOA timestamps of all second frames responsive to the first frames.

Aspect 26: The method of any one or more of Aspects 17-25, where the position of the STA is obtained independently of time periods or time delays associated with the STA.

Aspect 27: The method of any one or more of Aspects 17-26, where the time period is associated with an end of the transmission of the first frame and a start of the reception of the second frame; and each of the time delays is associated with an end of the reception of the first frame and a start of the reception of the second frame by the respective second device of the plurality of second devices.

Aspect 28: The method of any one or more of Aspects 17-27, where the time period is equal to a sum of a signal propagation time from the first device to the STA, a Short Inter-Frame Spacing (SIFS) duration associated with the STA, and a signal propagation time from the STA to the first device; and a respective time delay associated with a respective second device is equal to a sum of the signal propagation time from the first device to the STA, the SIFS duration associated with the STA, and a signal propagation time from the STA to the respective second device, minus a signal propagation time from the first device to the second device.

Aspect 29: The method of Aspect 28, where obtaining the position of the STA includes obtaining a first relationship between the time period and a difference between coordinates of the STA and coordinates of the first device; obtaining, for each of the plurality of second devices, a second relationship between the respective time delay associated with the respective second device and a difference between the coordinates of the STA and coordinates of the respective second device; obtaining the coordinates of the plurality of second devices; and obtaining the coordinates of the STA based on a trilateration of the first relationship and the second relationship for each respective second device of the plurality of second devices.

Aspect 30: The method of Aspect 29, further including obtaining the SIFS duration associated with the STA based on the first relationship and the second relationship for each respective second device of the plurality of second devices, and transmitting an indication of the SIFS duration to the STA.

Aspect 31: An apparatus for wireless communications, including means for transmitting a first frame to a wireless station (STA); means for receiving a second frame from the STA, the second frame responsive to the first frame; means for obtaining information indicating a time period between transmission of the first frame by the apparatus and reception of the second frame by the apparatus; means for obtaining information indicating time delays associated with a plurality of second devices, where each time delay of the time delays is between respective receptions of the first frame and the second frame by a respective second device of the plurality of second devices; and means for obtaining a position of the STA based on the time period, the time delays associated with the plurality of second devices, and signal propagation times between the apparatus and each of the plurality of second devices.

Aspect 32: A non-transitory computer-readable storage medium storing instructions that, when executed by one or more processors of an apparatus, cause the apparatus to perform one or more operations in accordance with any one or more of Aspects 17-30.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A first device, comprising:
at least one processor; and
at least one memory communicatively coupled with the at least one processor and storing processor-readable code that, when executed by the at least one processor, is configured to:
transmit a first frame to a wireless station (STA);
receive a second frame from the STA, the second frame responsive to the first frame;
obtain information indicating a time period between transmission of the first frame by the first device and reception of the second frame by the first device, wherein the time period is associated with an end of the transmission of the first frame and a start of the reception of the second frame;
obtain information indicating time delays associated with a plurality of second devices, wherein each time delay of the time delays is between respective receptions of the first frame and the second frame by a respective second device of the plurality of second devices, and each of the time delays is associated with an end of the reception of the first frame and a start of the reception of the second frame by the respective second device of the plurality of second devices; and
obtain a position of the STA based at least in part on the time period, the time delays associated with the plurality of second devices, and signal propagation times between the first device and each of the plurality of second devices.

2. The first device of claim 1, wherein execution of the processor-readable code is further configured to:
enable one or more services for the STA responsive to the position of the STA being within an area or structure; or
disable the one or more services for the STA responsive to the position of the STA being outside the area or structure.

3. The first device of claim 1, wherein the first frame comprises a Quality of Service (QOS) Null frame or a Ready-to-Send (RTS) frame, and the second frame comprises an acknowledgement (ACK) frame responsive to the QoS Null frame or a Clear-to-Send (CTS) frame responsive to the RTS frame.

4. The first device of claim 1, wherein the first frame comprises one of a single-user (SU) physical layer protocol data unit (PPDU) or a multi-user (MU) PPDU transmitted over an entire bandwidth of a wireless channel, and the second frame comprises an acknowledgement (ACK) frame or a block ACK (BA) frame received over the entire bandwidth of the wireless channel.

5. The first device of claim 1, wherein the first device comprises a first access point (AP) associated with the STA, and the plurality of second devices comprise a plurality of respective passive listening devices not associated with the STA.

6. The first device of claim 5, wherein execution of the processor-readable code to obtain the time delays is further configured to:
receive, from each of the plurality of second devices, a third frame indicating a respective time delay associated with the respective second device.

7. The first device of claim 1, wherein one or both of the information indicating the time delays associated with the plurality of second devices or the position of the STA is obtained from a network entity.

8. The first device of claim 7, wherein execution of the processor-readable code to obtain the position of the STA is further configured to:
obtain, from the network entity, coordinates of the STA relative to coordinates of the first device.

9. The first device of claim 1, wherein execution of the processor-readable code is further configured to:
assign a sequence number to the first frame;
transmit an indication of the sequence number to each of the plurality of second devices; and
transmit an instruction to each of the plurality of second devices to report time-of-arrival (TOA) timestamps of all first frames carrying the indicated sequence number and to report TOA timestamps of all second frames responsive to the first frames.

10. The first device of claim 1, wherein the position of the STA is obtained independently of time periods or time delays associated with the STA.

11. The first device of claim 1, wherein:
the time period is equal to a sum of a signal propagation time from the first device to the STA, a Short Inter-Frame Spacing (SIFS) duration associated with the STA, and a signal propagation time from the STA to the first device; and
a respective time delay associated with a respective second device is equal to a sum of the signal propagation time from the first device to the STA, the SIFS duration associated with the STA, and a signal propagation time from the STA to the respective second device, minus a signal propagation time from the first device to the second device.

12. The first device of claim 11, wherein execution of the processor-readable code to obtain the position of the STA is further configured to:
obtain a first relationship between the time period and a difference between coordinates of the STA and coordinates of the first device;
obtain, for each of the plurality of second devices, a second relationship between the respective time delay associated with the respective second device and a difference between the coordinates of the STA and coordinates of the respective second device;
obtain the coordinates of the plurality of second devices; and
obtain the coordinates of the STA based on a trilateration of the first relationship and the second relationship for each respective second device of the plurality of second devices.

13. The first device of claim 12, wherein execution of the processor-readable code is further configured to:
obtain the SIFS duration associated with the STA based on the first relationship and the second relationship for each respective second device of the plurality of second devices; and
transmit an indication of the SIFS duration to the STA.

14. The first device of claim 1, wherein execution of the processor-readable code is further configured to:
embed a signal or value within the first frame;
transmit an indication of the signal or value to each of the plurality of second devices; and
transmit an instruction to each of the plurality of second devices to report time-of-arrival (TOA) timestamps of all first frames carrying the embedded signal or value and to report TOA timestamps of all second frames responsive to the first frames that carry the embedded signal or value.

15. The first device of claim 14, wherein the embedded signal or value is indicated by one of a reserved or unused bit of a preamble of the first frame, a reserved or unused bit of a medium access control (MAC) header of the first frame, or a reserved or unused bit of an element, field, or subfield following the MAC header of the first frame.

16. A method for wireless communications by a first device, comprising:
transmitting a first frame to a wireless station (STA);
receiving a second frame from the STA, the second frame responsive to the first frame;
obtaining information indicating a time period between transmission of the first frame by the first device and reception of the second frame by the first device, wherein the time period is associated with an end of the transmission of the first frame and a start of the reception of the second frame;
obtaining information indicating time delays associated with a plurality of second devices, wherein each time delay of the time delays is between respective receptions of the first frame and the second frame by a respective second device of the plurality of second devices, and each of the time delays is associated with an end of the reception of the first frame and a start of the reception of the second frame by the respective second device of the plurality of second devices; and
obtaining a position of the STA based at least in part on the time period, the time delays associated with the plurality of second devices, and signal propagation times between the first device and each of the plurality of second devices.

17. The method of claim 16, further comprising:
enabling one or more services for the STA responsive to the position of the STA being within an area or structure; or
disabling the one or more services for the STA responsive to the position of the STA being outside the area or structure.

18. The method of claim 16, wherein the first frame comprises a Quality of Service (QOS) Null frame or a Ready-to-Send (RTS) frame, and the second frame comprises an acknowledgement (ACK) frame responsive to the QoS Null frame or a Clear-to-Send (CTS) frame responsive to the RTS frame.

19. The method of claim 16, wherein the first frame comprises one of a single-user (SU) physical layer protocol data unit (PPDU) or a multi-user (MU) PPDU transmitted over an entire bandwidth of a wireless channel, and the second frame comprises an acknowledgement (ACK) frame or a block ACK (BA) frame received over the entire bandwidth of the wireless channel.

20. The method of claim 16, wherein the first device comprises a first access point (AP) associated with the STA, and the plurality of second devices comprise a plurality of respective passive listening devices not associated with the STA.

21. The method of claim 20, wherein obtaining the time delays includes:
receiving, from each of the plurality of second devices, a third frame indicating a respective time delay associated with the respective second device.

22. The method of claim 16, wherein the first device comprises a network entity, one of the second devices comprises a first access point (AP) associated with the STA, and other of the second devices comprise respective second APs not associated with the STA.

23. The method of claim 22, wherein obtaining the position of the STA includes:
receiving, from the network entity, coordinates of the STA relative to coordinates of the first device.

24. The method of claim 16, further comprising:
assigning a sequence number to the first frame;
transmitting an indication of the sequence number to each of the plurality of second devices; and
transmitting an instruction to each of the plurality of second devices to report time-of-arrival (TOA) timestamps of all first frames carrying the indicated sequence number and to report TOA timestamps of all second frames responsive to the first frames.

25. The method of claim 16, wherein the position of the STA is obtained independently of time periods or time delays associated with the STA.

26. The method of claim 16, wherein:
the time period is equal to a sum of a signal propagation time from the first device to the STA, a Short Inter-Frame Spacing (SIFS) duration associated with the STA, and a signal propagation time from the STA to the first device; and
a respective time delay associated with a respective second device is equal to a sum of the signal propagation time from the first device to the STA, the SIFS duration associated with the STA, and a signal propagation time from the STA to the respective second device, minus a signal propagation time from the first device to the second device.

27. An apparatus, comprising:
means for transmitting a first frame to a wireless station (STA);
means for receiving a second frame from the STA, the second frame responsive to the first frame;
means for obtaining information indicating a time period between transmission of the first frame by the apparatus and reception of the second frame by the apparatus, wherein the time period is associated with an end of the transmission of the first frame and a start of the reception of the second frame;
means for obtaining information indicating time delays associated with a plurality of second devices, wherein each time delay of the time delays is between respective receptions of the first frame and the second frame by a respective second device of the plurality of second devices, and each of the time delays is associated with an end of the reception of the first frame and a start of the reception of the second frame by the respective second device of the plurality of second devices; and
means for obtaining a position of the STA based on the time period, the time delays associated with the plurality of second devices, and signal propagation times between the apparatus and each of the plurality of second devices.

28. A non-transitory computer-readable storage medium storing processor-readable code that, when executed by one or more processors of an apparatus, causes the apparatus to perform operations including:
transmitting a first frame to a wireless station (STA);
receiving a second frame from the STA, the second frame responsive to the first frame;
obtaining information indicating a time period between transmission of the first frame by the apparatus and reception of the second frame by the apparatus, wherein the time period is associated with an end of the transmission of the first frame and a start of the reception of the second frame;
obtaining information indicating time delays associated with a plurality of second devices, wherein each time delay of the time delays is between respective receptions of the first frame and the second frame by a respective second device of the plurality of second devices, and each of the time delays is associated with an end of the reception of the first frame and a start of the reception of the second frame by the respective second device of the plurality of second devices; and
obtaining a position of the STA based on the time period, the time delays associated with the plurality of second devices, and signal propagation times between the apparatus and each of the plurality of second devices.

* * * * *